(12) United States Patent
Stallaert et al.

(10) Patent No.: US 7,124,106 B1
(45) Date of Patent: Oct. 17, 2006

(54) APPARATUS FOR TRADING OF BUNDLED ASSETS INCLUDING BUNDLE SUBSTITUTION AND METHOD THEREFOR

(75) Inventors: Jan Stallaert, Austin, TX (US); Andrew Bernard Whinston, Austin, TX (US); Glenn William Graves, Malibu, CA (US)

(73) Assignee: Omega Consulting, Inc., Malibu, CA (US)

( * ) Notice: Subject to any disclaimer, the term of this patent is extended or adjusted under 35 U.S.C. 154(b) by 0 days.

(21) Appl. No.: 09/067,640

(22) Filed: Apr. 27, 1998

Related U.S. Application Data

(63) Continuation-in-part of application No. 08/992,647, filed on Dec. 17, 1997, now Pat. No. 6,035,287.

(51) Int. Cl.
*G06Q 40/00* (2006.01)

(52) U.S. Cl. .......................................... 705/37; 705/37
(58) Field of Classification Search .................. 705/35, 705/36, 36 R, 37
See application file for complete search history.

(56) References Cited

U.S. PATENT DOCUMENTS

| | | | |
|---|---|---|---|
| 4,412,287 A | 10/1983 | Braddock, III | |
| 4,674,044 A | 6/1987 | Kalmus et al. | 364/408 |
| 5,077,665 A | 12/1991 | Silverman et al. | |
| 5,101,353 A | 3/1992 | Lupien et al. | 364/408 |
| 5,136,501 A | 8/1992 | Silverman et al. | |
| 5,689,652 A | 11/1997 | Lupien et al. | |
| 5,873,071 A | 2/1999 | Ferstenberg et al. | |

OTHER PUBLICATIONS

Fan, et al., Creating Electronic Markets; Dr. Dobb's Journal; Nov. 1998; 5 pages.
Kalakota, et al.; Worldwide Real–Time Decision Support Systems for Electronic Commerce Applications; Journal of Organizational Computing and Electronic Commerce 6(1), 11–32 (1996); 22 pages; University y of Texas; Austin, Texas.
R.M. Miller; On Distributing the Intelligence of Economic Process; IFAC Economics and Artificial Intelligence; 1986; 2 pages; Aix–en–Provence, France.
Ming Fan et al., *Creating Electronic Markets*, Dr. Dobb's Journal, Nov. 1998, pp. 52, 54–56.
Ming Fan et al., *A Web–Based Financial Trading System*, Computer, vol. 32, No. 4, Apr. 1999, pp. 64–70.

(Continued)

*Primary Examiner*—Ella Colbert

(57) ABSTRACT

The present invention allows market participants to exchange bundles of assets, including assets in different asset classes. A market participant may value the bundle as an entity, alleviating the need to attempt to attain a value objective in the aggregate by valuing and trading assets individually. A bundle of assets to be traded is entered, wherein proportions of each asset to be traded in units of a specified bundle size are provided by the market participant. Assets to be acquired by one market participant are matched against the same asset which other market participants are seeking to dispose. A market participant may enter multiple bundles, and may specify substitutability among bundles by entering one or more portfolio constraints. An exchange of bundled assets among market participants, in units of the bundles themselves is effected when the exchange satisfies a predetermined set of criteria.

17 Claims, 9 Drawing Sheets

OTHER PUBLICATIONS

R. M. Miller, *On Distributing the Intelligence of Economic Processes*, Economics and Artificial Intelligence Proceedings of the IFAC/IFORS/IFIP/IASC/AFCET Conference, AIX–En–Provence, France, Sep. 2–4, 1986, p. 161, XP002102608.

Adams et al., "Commodity Bundling and the Burden of Monopoly," *The Quarterly Journal of Economics* vol. XC, 475–498 (1976).

Brewer et al., "A Binary Conflict Ascending Price (BICAP) Mechanism for the Decentralized Allocation of the Right to Use Railroad Tracks," Social Science Working Paper 887, California Institute of Technology, Division of the Humanities and Social Sciences, Pasadena, California (Feb. 1995).

Goodwin, Richard M., "Iteration, Automatic Computers, and Economic Dynamics," *Metroeconomica* vol. III, pp. 1–7, (Apr. 1951).

Levin, Jonathan, "An Optimal Auction for Complements," *Games and Economic Behavior* vol. 18, 176–192 (1997).

McAfee et al., "Multiproduct Monopoly, Commodity Bundling, and Correlation of Values," *The Quarterly Journal of Economics* 371–383 (May 1989).

Gjerstad et al., "Price Formation in Double Auctions," pp. 1–32 (Apr. 7, 1997).

McAfee et al., "Analyzing the Airwaves Auction," *Journal of Economic Perspectives* vol. 10, No. 1, 159–175 (Winter 1996).

Weber, Bruce W., "Transparency and Bypass in Electronic Financial Markets," Proceedings of the Twenty–Seventh Annual Hawaii International Conference on System Sciences, pp. 865–874 (1994).

Domowitz et al., "Auctions as algorithms," *Journal of Economic Dynamics and Control* vol. 18, pp. 29–60 (1994).

Radosevich, Lynda, "Wired," *Webmaster*, pp. 26–31 (Feb. 1997).

Branco, Fernando, "Designing Markets: on the Use of Combinational Bids in Multi–object Auctions," pp. 1–25 (May 1997).

McAfee et al., "Electronic Markets" in *Readings in Electronic Commerce*, pp. 293–309 (Addison Wesley Longman, Inc. 1997).

Hill et al., "Equity Trading, Program Trading, Portfolio Insurance, Computer Trading and All That," *Financial Analysts Journal*, pp. 29–35 (Jul.–Aug. 1988).

Rubinstein, Mark, "Market Basket Alternatives," *Financial Analysts Journal*, pp. 20–29 (Sep.–Oct. 1989).

McCabe et al., "Designing 'Smart' Computer–Assisted Markets: An Experimental Auction for Gas Networks," *Journal of Political Economy* vol. 5, pp. 259–283 (1989).

Rassenti et al., "A combinatorial auction mechanism for airport time slot allocation," *The Bell Journal of Economics*, vol. 13, pp. 402–417 (1982).

Domowitz, Ian, "The Mechanics of Automated Trade Execution Systems," *Journal of Financial Intermediation* vol. 1, pp. 167–194 (1990).

Rothkopf et al., "Computationally Manageable Cominatorial Auctions," pp. 1–26, Rutgers University (Dec. 1995).

Bikhchandani et al., "Competitive Equilibrium in an Exchange Economy with Indivisibilities," *Journal of Economic Theory* vol. 74, pp. 385–413 (1997).

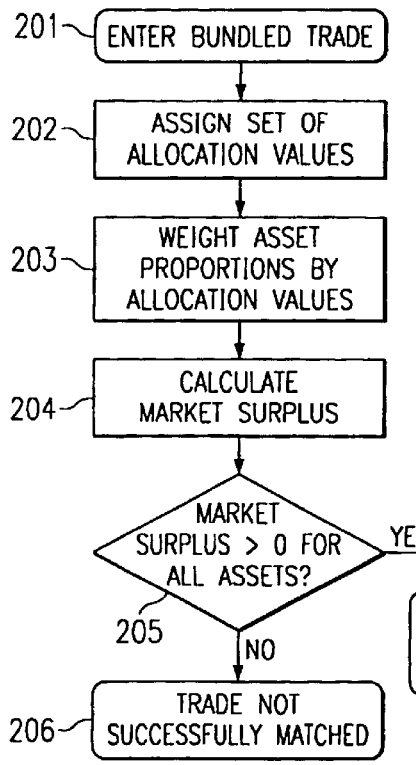
FIG. 1
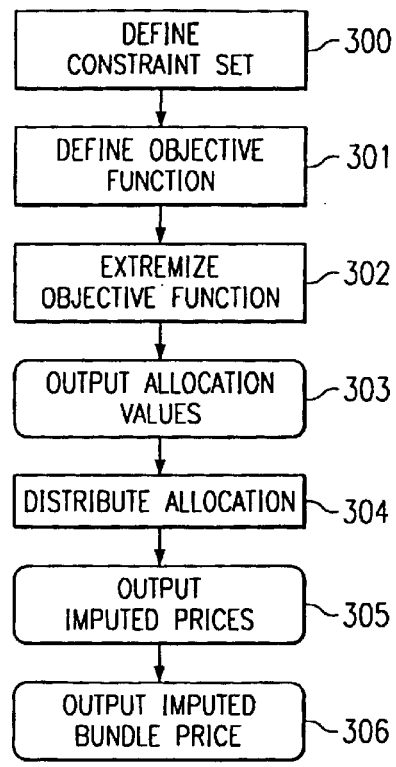
FIG. 2
FIG. 3
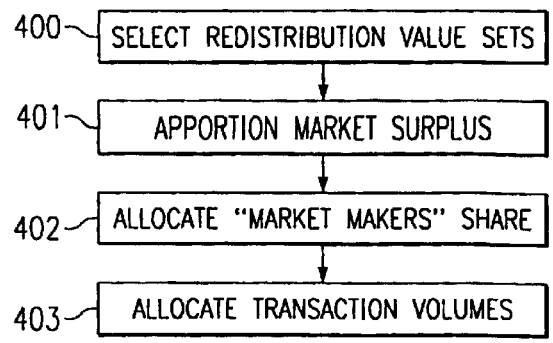
FIG. 4

FIG. 6A

| | BUNDLE 100a | BUNDLE 100b | BUNDLE 100c | BUNDLE 100d | MARKET SURPLUS | IMPUTED PRICES |
|---|---|---|---|---|---|---|
| ASSET 1: 101 | 1.5 | -.3 | 0 | -1 | 0 (602) | 0.7143 (614) |
| ASSET 2: 102 | 0 | 0 | -2 | 1 | 0 (603) | 1.43 (615) |
| ASSET 3: 103 | -1 | 1 | 3 | 0 | 0 (604) | 0.357 (616) |
| ASSET 4: 104 | -1 | 1.5 | 1.5 | -1 | 0.29 (605) | |
| BUNDLE SIZE: 105 | 30 | 30 | 25 | 50 | | |
| ALLOCATION VALUES: 601 | 0.5 (601a) | 0.179 (601b) | 0.107 (601c) | 0.214 (601d) | | |

| | 100a | 100b | 100c | 100d | REDISTRIBUTION VALUES |
|---|---|---|---|---|---|
| 606 | 0 (606a) | 0 (606b) | 0 (606c) | 0 (606d) | 1 (606e) |
| 607 | 0 (607a) | 0 (607b) | 0 (607c) | 0 (607d) | 1 (607e) |
| 608 | 0 (608a) | 0 (608b) | 0 (608c) | 0 (608d) | 1 (608e) |
| 609 | .45 (609a) | 0.161 (609b) | 0.096 (609c) | 0.193 (609d) | .1 (609e) |

| | 100a | 100b | 100c | 100d | MARKET MAKERS SHARE |
|---|---|---|---|---|---|
| 610 | 45 (610a) | -32.14 (610b) | 0 (610c) | -12.9 (610d) | 0 (610e) |
| 611 | 0 (611a) | 0 (611b) | -12.86 (611c) | 12.86 (611d) | 0 (611e) |
| 612 | -30 (612a) | 10.71 (612b) | 19.29 (612c) | 0 (612d) | 0 (612e) |
| 613 | -22.29 (613a) | 18.83 (613b) | 11.3 (613c) | -9.55 (613d) | 1.71 (613e) |

TRANSACTION AMOUNTS

APPARATUS FOR TRADING OF BUNDLED ASSETS INCLUDING BUNDLE SUBSTITUTION AND METHOD THEREFOR

CROSS-REFERENCE TO CO-PENDING APPLICATION

This Application is a continuation-in-part of application Ser. No. 08/992,647, filed Dec. 17, 1997, now U.S. Pat. No. 6,035,287, entitled A METHOD AND APPARATUS FOR BUNDLE ASSET TRADING.

TECHNICAL FIELD

The present invention relates to a method and apparatus for trading assets in bundles.

BACKGROUND INFORMATION

Data processing systems for the exchange of financial instruments and securities are old in the art. For example, the first subsystem to be employed in commercial practice was Instinet, which began operations in 1969. The Instinet system was a subject of U.S. Pat. No. 3,573,547 issued on Apr. 6, 1971. Instinet permits subscribers to engage in direct trading of securities among themselves on an anonymous basis. In effect, Instinet replaces the telephone and voice communications with communications conducted via the data processing system, with confirmations of trades being automatically transmitted to each party and to the appropriate clearing entity for settlement.

Other electronic data processing systems are exchange based order routing processors. For example, on the New York Stock Exchange (NYSE) is the Designated Order Turnaround System (or DOT) through which member firms transmit market and limit orders directly to the post where a security is traded, thereby dispensing with the messenger services of a floor broker. Limit orders are electronically filed while market orders are exposed to the (market) in front of the specialist's post, and executed either by a floor broker or the specialist. Automated data processing systems for small order execution exist in the dealer markets as well.

Regardless of the implementation, all such data processing systems for asset trading operate on an asset-by-asset basis. A trader (or a broker acting as his agent) may enter an order to acquire or dispose of a particular asset, or a portfolio of assets. In either case, individual transactions are consummated with respect to each of the assets individually. However, in many situations, a market participant does not necessarily derive value for a single asset, but for a basket of assets. In such a circumstance, the acquisition or disposition of assets on a asset-by-asset basis in order to obtain the basket of assets in the right proportion, and at the right price, may prove to be a complicated and time consuming task.

The market participant's problem is further exacerbated when the assets are within different asset classes. Here and throughout, the term asset is used in its broadest sense. An asset may be anything of value, and in a particular context, may be a commodity or other good, securities, or services, as well as money. To illustrate the problem, consider the supply chain problem as applied, for example, to cross docking operations. A typical instance of cross docking arises in the grocery trade.

In the grocery trade, goods are received from a multiplicity of producers and manufacturers for ultimate distribution in retail markets which are widely disbursed. A good flows to the grocer as a unitary item in bulk from the producer or manufacturer. These must then be broken into smaller unit sizes and distributed to the retail outlets, along with other goods from other manufacturers. Thus, the flow of goods from the producers must be warehoused and then redistributed. The facilities for warehousing and introduction of goods into a transportation stream for redistribution are the so-called cross docking facilities.

It is common practice to outsource the cross docking facilities and the transportation for redistribution. Thus, a grocer must acquire both the cross docking capacity and the transportation services to effect its objective, and these are acquired from different sources, that is, in a fragmented market. Moreover, the value of one of the two requirements is greatly diminished without the acquisition of the other.

The value to the grocer is in the aggregate, or basket, represented by the cross docking capacity and transportation service. In effect the price of one could be traded off against the other. If a ready means of cheap transportation is available, then the acquirer could afford to pay more for the cross docking capacity, or use a cross docking facility with wasted capacity, or vice versa. However, the fragmentation of the market for these services makes it difficult to implement such tradeoffs. An acquirer of the services would be better able to satisfy his requirements if he could obtain them as a bundle. Then he would only need to set the bundle price as his objective price. The bundle trading market would allocate price between the resources exchanged. Such a bundled trading mechanism also would squeeze out inefficiencies associated with the fragmented market for these resources.

A similar situation exists in the securities markets. A trader acquiring or disposing of a portfolio of equities may wish to hedge the acquisition or disposition by offsetting transactions in futures, options, or perhaps foreign currencies. The transactions implementing these acquisitions and dispositions take place in a fragmented market. The different assets are traded in different markets and the transactions may be displaced one from the other both in place and in time. Trading the assets individually in the fragmented market may lead to an overall loss with respect to the basket of assets due to market volatility. Thus, there is a need in the art for a method and apparatus for implementing a mechanism by which a market basket, or "bundle," of assets may be exchanged among market participants.

SUMMARY OF THE INVENTION

The previously mentioned needs are addressed by the present invention in which market participants will be able to exchange among themselves, a combination of assets as a bundle. An electronic data processing system executing a trade matching mechanism provides the function of a market intermediary, recombining assets from different market participants such that the requirements of participants seeking to acquire a particular asset are satisfied by participants seeking to dispose of the same asset.

Market participants enter their asset bundles into the data processing system. The data processing system operates continuously and market participants can submit new trade orders, or bundles, or cancel open orders, at any time. The data processing system operates continuously to find matches in real-time.

Each bundle contains a plurality of assets to be exchanged. Bundles are specified in terms of a bundle size, and a set of values representing the proportions of each of the assets to be exchanged, in terms of the bundle size. Each bundle may contain a subset of assets which the market participant seeks to acquire, and a second subset of assets of which the market participant seeks to dispose. Each market participant may enter one or more bundles. A market participant with more than one entered bundle may specify substantiability among the entered bundles by entering one or more portfolio constraints into the data processing system. Acquisition trades may be distinguished from disposition trades using a signature represented by an algebraic sign of each of the proportions of the respective assets within the bundle. For example, assets to be acquired, hereinafter referred to as acquisition assets, may be represented by a proportion having a positive algebraic sign, and assets of which the market participant seeks to dispose, hereinafter referred to as disposition assets, may be represented by a negative algebraic sign.

As bundles are entered, the data processing system matches trades among the plurality of all bundles. The data processing system accomplishes the matching by assigning a set of non-negative numerical values to each bundle of the plurality of bundles entered which are to be incorporated into the match trade. Each of these numerical values represents the proportion by which each participating bundle is represented in the matched trade. That is, the numerical value represents the allocation of any particular participating bundle to the match trade. Then, the proportion of each asset in a particular bundle that is committed to the exchange is represented by the proportion of the asset in the bundle multiplied by the allocation value assigned by the data processing system to that particular bundle.

In one embodiment of the present invention, a trade is matched when the market surplus for each asset to be exchanged is non-negative. The allocation values are chosen by the data processing system so that this matching condition is satisfied. A non-negative market surplus in an asset occurs when the net valuation of the asset among disposing market participants is equal to, or exceeded by, the net valuation placed on the asset by acquiring market participants. The valuations, in turn, are represented by the proportions of each asset in each of the bundles forming the trade.

The data processing system implementing the bundle trading market may be a distributed data processing system.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 schematically illustrates bundled trades according to an embodiment of the present invention;

FIG. 2 illustrates a flow diagram of a method of bundled trading in accordance with an embodiment of the present invention;

FIG. 3 illustrates a flow diagram of a method of bundled trading in accordance with another embodiment of the present invention;

FIG. 4 illustrates a flow diagram of a method of market surplus redistribution in accordance with an embodiment of the present invention;

FIG. 6A schematically illustrates a matched transaction in accordance with an alternative embodiment of the present invention;

FIG. 11C schematically illustrates the interaction of distributed data processing threads according to another alternative embodiment of the present invention;

DETAILED DESCRIPTION

Figure 5:
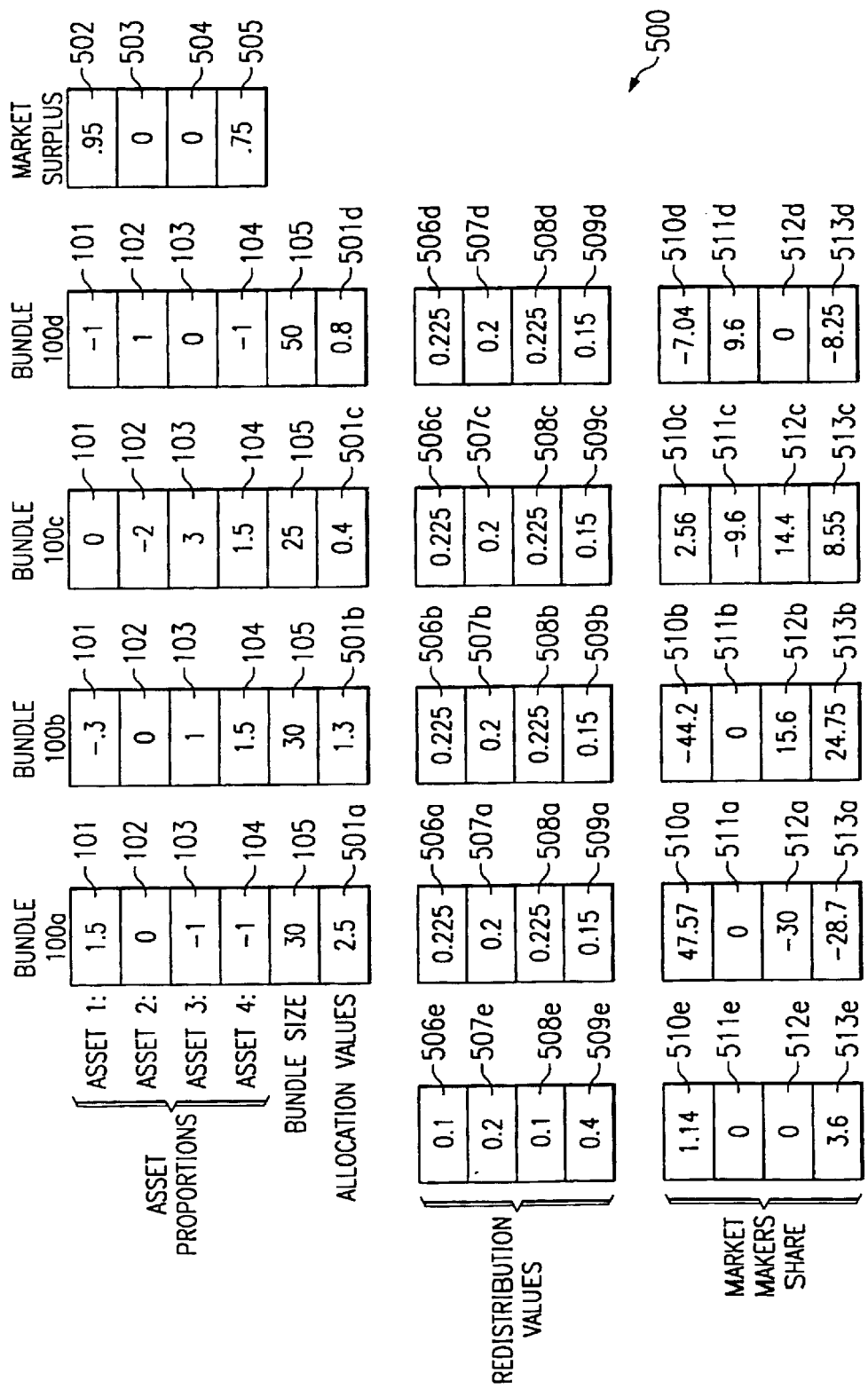
FIG. 5 schematically illustrates a matched transaction in accordance with an embodiment of the present invention.

In the following description, numerous specific details are set forth to provide a thorough understanding of the present invention. However, it will be obvious to those skilled in the art that the present invention may be practiced without such specific details. Refer now to the drawings wherein depicted elements are not necessarily shown to scale and wherein like or similar elements are designated by the same reference numeral through the several views.

An invention that addresses the problem of market fragmentation will now be described in detail. Refer now to FIG. 1 in which a bundled trade is schematically illustrated. Bundled trade 100 includes four bundles, bundle 100a, bundle 100b, bundle 100c and bundle 100d. Each of bundles 100a–100d may be associated with an individual market participant, but such an association is not essential. A particular market trader might, in principle, offer an unlimited number of different bundles for trade. Entries 101–104 in each of bundles 100a–100d are associated with an asset to be exchanged. Each entry 101, 102, 103, and 104 is associated with an individual asset, assets 1–4, in the embodiment of FIG. 1. As described hereinabove, assets may incorporate anything of value. Furthermore, it is understood that bundles 100a–100d including only four assets to be exchanged are illustrative only, and that in practice, trade bundles would include a plurality of assets to be exchanged in which the plurality in a representative embodiment of the present invention could include more or less than four assets.

Trade bundles specify the proportion of each asset to be exchanged. The proportions of assets to be traded are represented by the figures within entries 101–104. For example, the asset represented by entry 101, asset 4, in bundle 100a is to be exchanged in 1.5 units of that asset. This value and all the values in entries 101–104 are proportional values. That is, they represent the proportion of each asset to be exchanged in a particular bundle relative to a size of the bundle. The bundle size is represented in entry 105 in each of bundles 100a–100d. Furthermore, the algebraic sign of each of the entry values is a signature that denotes whether the particular asset represented by the entry is an offer to acquire or an offer to dispose. In the embodiment of the invention illustrated in FIG. 1, acquisition offers are represented by entries having a positive algebraic sign and entries representing an offer to dispose have a negative algebraic sign.

It should be noted that an embodiment of the present invention may include assets none of which are money or currency. That is, an embodiment of bundle trading may exchange assets in which all exchanges are barter trades. Therefore, transactions in which in the context of a money exchange would otherwise be referred to as a buy and a sell are herein more generally referred to as an acquisition and a disposition, respectively. Moreover, it should be appreciated that the sign conventions in the embodiment of FIG. 1 signalling acquisition offers and disposition offers may be arbitrarily selected, and the opposite sign convention may be employed in an alternative embodiment of the present invention. This will subsequently be discussed further when the methods of the present invention are described in detail.

The plurality of the portion values in each of bundles 100a–100d effectively represent limit "prices." This is perhaps most easily seen if one of the assets in a bundle represents a currency. For example, if asset 1, entry 101, in bundled trades 100 represents a currency, then the market participant associated with bundle 100d is willing to pay, that is dispose, of one unit of currency in order to acquire a unit of asset represented by entry 102, asset 2. Note that this market participant would also be willing to give up one unit of asset 4, represented by entry 104, as well. Thus, from the perspective of the market participant associated with bundle 100d, the transaction proposed is a combination of a barter transaction and cash transaction. Recall, however, that an embodiment of the present invention may include bundled trades in which no asset represents a currency. That is, an embodiment of the present invention, as discussed hereinabove, may include only barter trades. It is not necessary that at least one asset be a currency, although alternative embodiments of the present invention may include trade bundles having at least one asset which is a currency, and other alternative embodiments might include a plurality of assets representing different currencies. Because an embodiment of the present invention may include trade bundles that are purely barter transactions, it is more precise to regard the plurality of proportion values in each of bundles 100a–100d as relative valuations, rather than a "price."

The data processing system of the present invention receives the bundled trades and selects bundles from among a plurality of bundles for participation in a particular transaction. Refer now to FIG. 2 in which is schematically illustrated a flowchart of a method in accordance with the present invention. A bundled trade, including each of bundles 100a–100d of FIG. 1, is entered into a data processing system (see FIGS. 8 and 12) in step 201. In an embodiment of the data processing system of the present invention, the data processing system may be a distributed data processing system in which market participants enter trade bundles via a network, such as the Internet, through the intermediation of a data processing server. Such an embodiment will be subsequently discussed in greater detail. The data processing system then matches trades from among a plurality of entered trade bundles. The matching process encompasses steps 202–205 in FIG. 2.

In matching the trade, each bundle that is participating in a particular trade is assigned a relative allocation by the data processing system. In step 202, an allocation value is assigned to each of the bundles included in the match trade from among the plurality of entered bundles. For the purposes of further description of the present invention, it is convenient to introduce the indexed variable, $x_j$, to represent the set of allocation values. The index "j" represents the bundle number of bundles in the matched trade. The proportions of each asset in the plurality of assets in each of the bundles are then weighted by the respective allocation value for each of the trade bundles in step 203. It is convenient for the purpose of further discussion to introduce the doubly indexed quantity $z_{ij}$ to represent the plurality of all asset proportions for all of the asset entries in all of the bundles in the bundle trade. As above, "j" represents the bundle number, and "i" represents the asset associated with the asset proportion "$z_{ij}$". The maximum value that i can assume is the number of assets that may be traded in an embodiment of the present invention, and, as hereinabove noted, the maximum value of j is given by the number of bundles included in the match trade. In this notation, the step of weighing the asset proportions by the allocation values in 203 may be represented as:

$$y_{ij} = x_j z_{ij} \forall i \in \{1, \ldots, m\}, j \in \{1, \ldots, n\} \qquad (1)$$

The weighted asset proportions have been symbolized by the further notation "$y_{ij}$". The maximum number of assets that may be traded in an embodiment of the present invention is represented by the symbol "m", and the number of trade bundles in the match trade has been denoted by the symbol "n". A market surplus is then calculated for each asset in step 204. The market surplus for each asset will be denoted by the symbol "$\mu_i$". In an embodiment of the present invention, the market surplus for each asset according to step 204 is given by:

In step 205, if the market surplus for each asset is non-negative, then the data processing system will redistribute the market surplus in step 207. The step $$\mu_i = -\sum_{j=1}^{n} y_{ij} \forall\ i \in \{1, \ldots, m\} \qquad (2)$$

of redistribution, step 207, will subsequently be further described in detail. If the market surplus for each asset is not non-negative, then the trade match based on the assigned set of allocation values is not a successful match, step 206. The data processing system must then search for another trade match among the plurality of entered trade bundles. In an embodiment of the present invention according to step 205, acquisition offers have a positive algebraic sign and disposition offers have a negative algebraic sign. In an alternative embodiment in which the opposite sign invention is adopted, the condition with respect to the market surplus in a step corresponding to step 205 is that the market surplus be non-positive.

In the event a trade match is unsuccessful, the data processing system might search among the entered bundle trades using a trial and error process. However, in the data processing system in which the number of entered trade bundles is realistic, such a method is likely to be inefficient and slow. Therefore, a systematic process for finding match trades is to be preferred.

An embodiment of the present invention implementing a systematic process for matching trades will now be described. Refer now to FIG. 3 in which a flow diagram of a method for matching trades by an optimization process is illustrated. In step 300, a constraint set is defined. In an embodiment of the present invention wherein trade matching is accomplished by an optimization process, a member of the constraint set is the requirement that the market surplus for each asset be non-negative, as described hereinabove. In terms of the symbol $\mu_i$, the first member of the constraint set becomes $\mu_i \geq 0$, in an embodiment in which acquisition assets are represented by positive algebraic sign and disposition assets by negative algebraic sign. In an alternative embodiment having an opposite sign convention, the first member of the constraint set becomes $\mu_i \leq 0$. The second member of the constraint set imposes a constraint on the allocation values which are to be determined as a solution to the optimization process. In an embodiment of the present invention, the second member of the constraint set may be:

$$0 \leq x_j \leq u_j \forall j \in \{1, \ldots, n\}. \quad (3)$$

The symbol "$u_j$" has been introduced for convenience and denotes the bundle size, discussed previously, of bundle number "j". In an alternative embodiment of the present invention, the second member of the constraint set may be taken to be:

$$\sum_{j=1}^{n} x_j \leq 1,$$

and $$x_j \geq 0 \forall j \in \{1, \ldots, n\}. \quad (4)$$

In step 301, an objective function is defined. In an embodiment of the present invention, an objective function may be a so-called convex combination of the market surpluses of each of the assets, that is, the $\mu_i$. It is convenient to introduce the following notation for this convex combination of market surpluses:

$$\sum_{i=1}^{m} c_i \mu_i, c_i \text{ real.} \quad (5)$$

In this expression, the "$c_i$" are preselected constants representing the weighted contribution that asset "i" makes to the objective function. A preselected set of the $c_i$ defines a particular embodiment of a bundled trade data processing system of the present invention. Alternative selections define alternative embodiments. Market participants may elect to enter trades into one or another of competing embodiments depending on the preselected set of $c_i$. This will subsequently be illustrated by way of example.

The set of allocation values, $x_j$, are determined by a step of extremization of the objective function in step 302. The step of extremization, step 302, may be either a maximization or a minimization, depending on the sign convention adopted for the set of asset proportions, $z_{ij}$, previously discussed. Thus, in an embodiment of the present invention wherein a positive value for a $z_{ij}$ is a signature for an acquisition trade and a negative value for a $z_{ij}$ is a signature of a disposition trade, then the step of extremization, step 302, is a maximization step. Conversely, in an embodiment having a sign convention wherein a negative value of $z_{ij}$ is a signature of an acquisition transition and a positive value of a $z_{ij}$ is a signature for a disposition trade, then the step of extremization, step 302, is a minimization step. The extremization step, step 302, determines the set of allocation values, $x_j$, outputted in step 303. Note that because the extremization is subject to the constraint set, and the first member of the constraint set requires that the market surplus for each asset be non-negative, step 205 of FIG. 2 is necessarily satisfied, and a satisfactory trade match is obtained.

Figure 13:
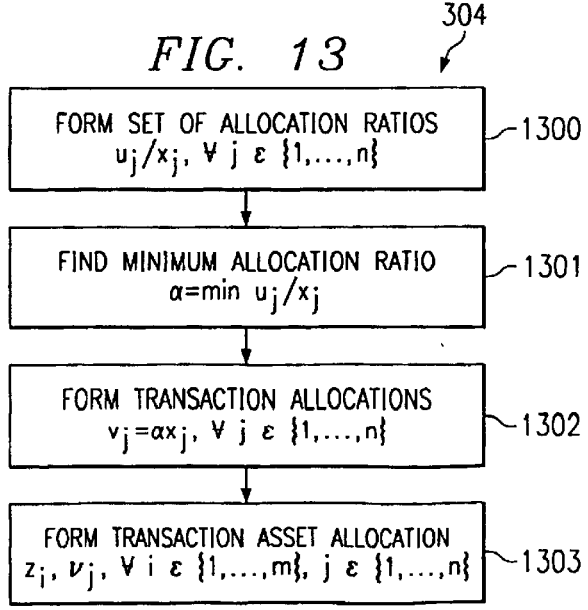
FIG. 13 illustrates a flow diagram of a method of allocation distribution according to an embodiment of the present invention.

After the set of allocation values are outputted, it is necessary to distribute an allocation in step 304, among the matched trade bundles such that the bundle having the smallest bundle size, $u_j$, in proportion to its allocation value, $x_j$, is just exhausted by the matched trade. This can be accomplished by rescaling the allocation values, $x_j$, according to the following, detailed in steps 1300–1302 of FIG. 13:

$$v_j = \alpha x_j \forall j \in \{1, \ldots, n\},$$

where $\alpha = \min u_j/x_j$. (6)

The symbol "$v_j$" represents the actual transaction allocation for bundle number "j". Transaction asset allocations are then determined by multiplying the asset proportions $z_{ij}$ by the actual transactions allocations $v_j$, in step 1303.

The optimization process also yields the imputed prices of the assets exchanged in step 305. These are the so-called duals known in the linear programming art. The duals represent the marginal change in the objective function due to a marginal change in the constraints. In an embodiment of the present invention, the constraint set includes the asset proportions. Thus, a subset of the duals represents the marginal change in the asset proportions required to produce a marginal increase in the objective function, Equation (5). That is, those duals represent the "cost," or "price," in unit asset terms, of marginally increasing the aggregated market surplus represented by the convex combination in Equation (5). The asset "prices" are measured in terms of that combination, and are termed the imputed prices of the respective asset. For example, an embodiment of the present invention might include as assets each of the European currencies that will be combined to form the Euro. Preselecting the $c_i$ in Equation (5) to match that combination, would then yield market surplus in Euros, and the imputed price of each asset would be measured in Euros. Imputed prices will subsequently be illustrated by way of example. In step 305, imputed prices for each asset are outputted, and the imputed price for the bundle, calculated by adding up the imputed asset prices weighted by each asset's proportion in the bundle, are outputted in step 306. It then remains to redistribute the market surplus, as in step 207 of FIG. 2, which will now be discussed in detail.

Refer now to FIG. 4 illustrating a flowchart detailing the market surplus redistribution in step 207 in FIG. 2. In step 400, sets of redistribution values are selected. The set of redistribution values includes a value associated with each asset and each bundle for a total of m×n such values. In addition, the set of redistribution values includes an additional "m" values, one for each asset, that is associated with a market participant in the role of "market maker." In an embodiment of the present invention, the data processing system itself may play the role of the market maker. Thus, the set of redistribution values includes m×(n+1) values in total. Moreover, each redistribution value must lie in the range of values from zero to one, inclusive, and the subset of redistribution values associated with asset number "i" must add up to one when summed over all match trades plus the redistribution value associated with the market maker for asset number "i". It is convenient to introduce the notation "$W_{ij}$" to denote the set of redistribution values. In terms of this notation, the properties of the redistribution values heretofore recited may be written as follows:

$$W_{ij}, i \in \{1, \ldots, m\}, j \in \{0\} \cup \{1, \ldots, n\}$$

$$0 \leq W_{ij} \leq 1 \forall i, j' \text{ and} \tag{7}$$

$$\sum_{j'=0}^{n} W_{ij} = 1 \forall i. \tag{7}$$

In step 401, the market surplus is apportioned by forming the m×n values in accordance with: $W_{ij}\mu_i\alpha$, $i \in \{1, \ldots, m\}$, $j \in \{1, \ldots, n\}$. In similar fashion, the market maker's share is allocated in step 402 in accordance with: $W_{i0}\mu_i\alpha$, $i \in \{1, \ldots, m\}$. An embodiment having no redistribution would simply have all of the "$W_{ij}$" equal to zero, and "$W_{i0}$" equal one.

In an embodiment of the present invention, the market maker may retain this allocation as a fee. A special case of such an embodiment is an embodiment in which one or more of the assets to be traded is a currency, and the market maker retains an allocation in that asset in accordance with step 402. That allocation may be interpreted as a commission. Such an embodiment will be subsequently discussed by way of example.

Transaction volumes are allocated among the matched bundled trades in step 403. In this step, the actual amounts of each asset to be exchanged among the market participants are allocated in accordance with:

$$z_{ij}v_j + W_{ij}\mu_i \alpha i \in \{1, \ldots, m\}, j \in \{1, \ldots, n\}. \tag{8}$$

There are two important points with respect to the step of redistribution of the market surplus. From the properties of the asset proportions "$z_{ij}$" and the redistribution values, "$W_{ij}$", as well as the market surpluses "$\mu_i$", as discussed hereinabove, each market participant is in a better position with respect to each asset in the bundle than it otherwise would have been in the absence of the redistribution. In other words, a market participant in a dispositional transaction with respect to asset number "i" disposes of less of that asset than it otherwise would have in the absence of redistribution, and a market participant in an acquisitional transition receives a greater amount of that asset than he otherwise would have received in the absence of redistribution. The other point is that the preselected values in an embodiment of the present invention for the $W_{ij}$, effectively define the structure of the bundled trading market data processing system for that embodiment. Therefore, an electronic market place that is an embodiment of the present invention having a first preselected set of values $W_{ij}$, may compete with an alternative embodiment of an electronic bundled trading market having a second preselected set of values $W_{ij}$. Market participants may select among competing embodiments in accordance with a redistribution defined by the alternative preselected sets of redistribution values. Before discussing an electronic market place embodied in a distributed data processing system of the present invention, two embodiments of the present invention including the step of redistribution, 207, will be described by way of example with respect to bundled trade 100.

Refer now to FIG. 5 in which a bundled trade transaction 500 is illustrated in tabular form. In transaction 500, trade bundles 100a–100d have been matched with the allocation values as shown in fields 501a–501d, respectively. The market surplus associated with each of the assets represented in fields 101–104, assets 1–4, are shown in fields 502–505. As the values appearing in fields 502–505 show, the market surplus for each of the assets represented is non-negative. Thus, transaction 500 represents the successful match with respect to bundles 100a–100d, in accordance with the previous discussion. In fields 506a–506d are shown the redistribution values corresponding to trade bundles 100a–100d for the asset represented in field 101, asset 1. Similarly, fields 507a–507d represent the redistribution values for the second asset in the transaction, the asset represented in the trade bundles by field 102, asset 2. Likewise, fields 508a–508d and fields 509a–509d represent the redistribution value for the third and fourth assets, those represented by fields 103 and 104 in bundles 100a–100d, to be exchanged in transaction 500.

In an embodiment of the bundled trading system of the present invention represented in transaction 500, each trade bundle 100a–100d, participates equally in the redistribution of the market surplus. This is apparent in that with respect to each asset, the redistribution value for each bundle is the same. However, it should be noted that this is not essential, and a different embodiment may have redistribution values such that different market participants, as represented by their bundled trades, receive different redistributions of the market surplus with respect to any or all of the assets in the trade bundle.

In transaction 500, the market maker also participates in the redistribution of the market surplus. Fields 506e–509e contain the redistribution values for each asset in the transaction that determine the market maker's share of the market surplus with respect to each of the assets. Thus, in field 506e, the market maker receives a ten percent share with respect to the market surplus in asset 1, corresponding to field 101. Similarly, as shown by the values in fields 507e–509e, respectively, the market maker receives a twenty percent share of the market surplus with respect to asset 2, a ten percent share of the market surplus with respect to asset 3, and a forty percent share of the market surplus with respect to asset 4, the assets corresponding to fields 102–104. The market maker's share of the market surplus may be viewed as the market maker's "fee" or "commission." However, as discussed hereinabove, transaction 500 may be a barter transaction, in which none of the assets traded represent money.

The actual amount of assets to be exchanged among market participants, a so-called transaction volume, is then found according to Equation (8). The transaction volume for each bundle with respect to the first asset is given in fields 510a–510d. In transaction 500, negative transaction volumes correspond to assets that are being disposed of in a given bundle, and transaction volumes with a positive value are assets being acquired in a given bundle. Fields 511a–511d, 512a–512d, and 513a–513d are the transaction volumes for each bundle for assets 2, 3, and 4, respectively. The market maker's share of each asset appears in field 510e–512e. Several points with respect to the transaction volumes will now be discussed.

Transaction 500 exhausts the supply of asset 3 in bundle 100a. The market participant with respect to bundle 100a has entered a bundle trade in which it seeks to dispose of 30 units of asset of the third asset, represented by field 104. Field 104 in bundle 100a contains the asset proportion value of −1, and the bundle size of bundle 100a is 30 units, as shown in field 105 in bundle 100a. In exchange, the market participant with respect to bundle 100a acquires 47.57 units of the first asset in the bundle, represented by field 101. Note that market participant with respect to bundle 100a sought 45 units of the first asset in the bundle, in accordance with the asset proportion value of 1.5 in field 101 of bundle 100a, and a bundle size of 30 in field 105 of bundle 100a. Thus, by virtue of the redistribution, the market participant with respect to bundle 100a has obtained slightly more of the first asset than it sought. In addition to the 30 units of the third asset, represented by field 104, the market participant with respect to bundle 100a also had to give up 28.7 units, field 510a, of asset 4, represented by field 104 in bundle trade 100a. The market participant with respect to bundle 100a had offered up to 30 units of asset 4, in accordance with an asset proportion value of $-1$ in field 104, in bundle 100a, and a bundle size of 30 units, field 105 of bundle 100a. Thus, the market participant with respect to bundle 100a has had to "pay" slightly less in asset 4 than his limit order with respect to that asset, by virtue of the redistribution of the market surplus.

The market maker has received 1.14 units of the first asset, represented by field 101, the value in field 510e. The market maker's allocation is in accordance with Equation (7). The market maker receives no allocation with respect to the second and third assets because, as seen in fields 503 and 504, as there was no market surplus with respect to those assets. With respect to asset 4, the market maker received 3.6 units, as seen in field 513e.

Refer now to FIG. 6 in which transaction 600 in accordance with another embodiment of the present invention is depicted. In transaction 600, allocation values 601a–601d corresponding to bundles 100a–100d, respectively, are determined in accordance with an embodiment of the present invention using an optimization step, such as step 302 of FIG. 3. In this embodiment, the market surplus with respect to asset 4 has been used as the objective function. That is, in terms of Equation (5), the $c_i$ corresponding to assets 1–3, $c_1$, $c_2$, and $c_3$, are all zero and $c_4$ has a value of 1. The market surplus with respect to three of the four assets included in bundles 100a–100d, corresponding to asset proportions represented in fields 101–103, respectively, are zero, as shown in fields 602–604. For illustrative purposes, asset 4, corresponding to asset proportions included in field 104, may be considered a currency. The market surplus with respect to the currency is shown in field 605 to be 0.29 units of the currency.

In the embodiment of the present invention in transaction 600, the redistribution values associated with each of the noncurrency assets are preselected to be zero with respect to each trade bundle 100a–100d. This is shown in fields 606a–606d, 607a–607d, and 608a–608d. Concomitantly, the redistribution value associated with the noncurrency assets with respect to the market maker is, therefore, 1, as shown in fields 606e, 607e, and 608e. That is, in the embodiment of transaction 600, the market maker plays the role of a market specialist in a traditional exchange with respect to the noncurrency assets. In such an embodiment, the market maker retains his share of the noncurrency assets as an inventory which he may then dispose of as a market participant.

The currency is redistributed according to redistribution values in fields 209a–609e. With respect to the currency, the market maker receives a ten percent allocation of the market surplus, 609e. With respect to the market participants corresponding to bundles 100a–100d, the market surplus in the currency is allocated according to redistribution values preselected in proportion to the respective allocation values for each bundle, 601a–601d. These redistribution values are shown in fields 609a–609d, respectively. This simply says that in the market embodiment of transaction 600, each market participant receives payment, or makes payment, as appropriate, in proportion to the amount of its bundle that is exchanged.

Transaction 600 exhausts bundle 100a with respect to the third asset, in accordance with the asset proportion, field 104, of bundle 100a and a bundle size, field 105, of bundle 100a. This is in accordance with Equation (6), which ensures that at least one bundle included in a matched trade will be exhausted. Market participant with respect to bundle 100a acquires 45 units of the first asset, in accordance with the asset proportion in field 101 of bundle 100a and the bundle size in field 105 of bundle 100a. However, the market participant also has to pay 22.29 units of currency, field 613a, in order to secure the 45 units of the first asset in exchange for its 30 units of the third asset. Nevertheless, due to the redistribution of the market surplus, the market trader with respect to bundle 100a pays less than his limit price of 30 units corresponding to the asset proportion value of $-1$ for the currency asset, field 104 in bundle 100a, and the bundle size of 30 units in field 105 of bundle 100a.

The assets acquired in bundle 100a are supplied by dispositions in the remaining bundles, bundles 100b–100d. Thus, the 45 units of the first asset in bundle 100a, field 610a, are supplied by a disposition of 32.14 units in bundle 100b, field 610b, and a disposition of 12.9 units from bundle 100d, field 610d. Likewise, the 30 units of asset 3 disposed of by the market participant in bundle 100a are acquired as 10.71 units in bundle 100b, field 612b, and 19.29 units in bundle 100c, field 612c. This is a consequence of there being no market surplus with any asset other than the currency, and therefore, there is nothing for the market maker to inventory.

In transaction 600, the optimization step, for example step 302 in FIG. 3, yields imputed prices for assets 1, 2, and 3, as discussed hereinabove. These =imputed prices are displayed in fields 614, 615, and 616, respectively. Because the optimization step in transaction 600 maximizes the market surplus in asset 4, which for illustration has been interpreted to be a currency, the imputed prices in a fields 614–616 are measured in units of that market surplus, namely, currency units, as discussed hereinabove. In other words, the imputed price of a unit of asset 1 is 0.7143 units of the currency representing asset 4, as shown in field 614. Similarly, the imputed price of asset 2 is 1.43 currency units, field 615 and of asset 3, 0.357 units of currency, field 616.

Consider now bundle 100a in which 45 units of asset 1, field 610a, were exchanged for 30 units of asset 3, field 612a, and 22.29 units of currency, field 613a. Multiplying the imputed price of asset 1 by 45 units and subtracting 30 times the imputed price of asset 3 yields a net price that the market participant with respect to bundle 100a must pay of 21.42 currency units. However, this price does not include the market participant's share of the market maker's commission. The market participant corresponding to bundle 100a enjoys share of the redistribution is proportionately larger, at 45 percent, field 609a, than the redistribution received by the market participants. Thus, the market participant with respect to bundle 100a is responsible for a larger fraction of the market maker's commission. The market participant with respect to bundle 100a is, in fact, responsible for 50 percent of the market maker's commission because its 45 percent redistribution represents 50 percent of the aggregate redistribution to all the market participants. That is, the 45 percent in field 609a represents 50 percent of the redistribution net of the market maker's share. As previously described, the market maker's share is 1.71 units of currency, 613e. Thus, the market participant with respect to bundle 100a is responsible for 50 percent of that, or 0.86 units of currency. Adding this to the net price it must pay with respect to the assets, yields the 22.29 units of currency that the market participant with respect to bundle 100a must pay, as previously discussed, and displayed in field 613a. The transactions with respect to bundles 100b–100d can be interpreted in similar fashion.

Although the embodiment of the present invention represented in transaction 600 is convenient in order to describe the intuitive interpretation hereinabove recited, such interpretation is unnecessary to the implementation of the present invention.

In yet another embodiment of a bundled trading mechanism according to the principles of the present invention, traders may offer trade bundles in which bundles may serve as substitutes for each other. As discussed in conjunction with FIG. 1, each market participant may offer one or more trades. Any individual market participant may consider a preselected subset of its set of trades to be substitutable, one for another. In other words, with respect to a preselected subset of offered trades, a market participant might be indifferent as to exchanges with respect to any members of the subset. For example, if a first bundle and a second bundle were perfect substitutes, then the market participant offering to exchange those bundles would be indifferent as to whether a trade matched the first bundle or the second bundle. More generally, a market participant may not be completely indifferent as to exchanges of bundles, and weight the exchange of preselected bundles in the subset. An embodiment of the present invention which incorporates bundle substitution will now be described.

In an embodiment of the present invention, substitution of bundles entered by a market participant is effected when transaction volumes are allocated among the matched trades. Allocation of transaction volumes have been discussed hereinabove in conjunction with FIG. 4. A market participant indicates to the allocation mechanism, the substitutability of bundles by entering one or more portfolio constraints. For a particular market participant, a set of portfolio constraints may be defined by:

$$\sum_{j \in T_k} a_{kj} x_j \leq b_k \tag{9}$$

where j indexes the trade bundles, and k indexes the constraint. The $x_j$ are the allocation values discussed hereinabove in conjunction with FIG. 2. Recall that a market participant may specify more than one portfolio constraint. The bundle index, j, only runs over the trade bundles corresponding to the particular market participant, and T denotes the set of all bundled trade offers belonging to the particular market participant. The quantities $a_{kj}$ are a set of portfolio weights supplied by the market participant to specify his or her bias with respect to the substitutability of bundle trade offers. For example, if a market participant were indifferent as between two bundles, then the weights assigned those two bundles in a portfolio constraint would be equal. The constraint limits $b_k$ are specified by the market participant and ensure that no more than $b_k$ units of bundles, substituted according to the kth portfolio constraint, are exchanged, in total.

Alternatively, j may be taken to index trade bundles associated with the "kth" portfolio constraint, $j \in T_k$, where $T_k$ is the set of bundles associated with the "kth" portfolio constraint. The sets T and $T_k$ are either the same, or, at most, differ only with respect to members that correspond to portfolio weights having the value zero. Thus, the portfolio constraints are the same in either case.

In allocating trade volumes, the allocation mechanism must not allocate a trade volume that violates a market participant's portfolio constraint. Note that in this embodiment, portfolio constraints are imposed when trade volumes are allocated, not when bundles are matched. The portfolio constraints corresponding to a particular market participant involved in a matched trade are accounted for by first defining a quantity $\delta_t$ by:

$$S_t \equiv \min \frac{b_k}{\sum_{j \in T} a_{kj} x_j}, k \in C^T \tag{10}$$

where t indexes the set τ, the set of all market participants involved in a particular matched trade, and $C^T$ denotes the set of portfolio constraints corresponding to a particular market participant. Thus, $\delta_t$ represents the most restrictive portfolio constraint associated with the "tth" market participant in the particular matched trade. Then, the most restrictive of the portfolio constraints from among all of the market participants involved in a particular matched trade may be satisfied by defining:

$$\beta \equiv \min_{t \in i} \{S_t\} \tag{11}$$

and, forming actual transaction allocations $v_j$ as in Eq. (3), but with α, in this embodiment, defined by:

$$\alpha = \min\{\beta, \min\{u_j/x_j\} \forall j \in [1, \ldots, n]\} \tag{12}$$

The $u_j$ are the bundle sizes previously discussed in conjunction with FIG. 3. In this way, the actual allocation also ensures that bundles are not oversubscribed in the particular matched trade.

After transaction volumes have been allocated, bundle sizes $u_j$ and constraint limits $b_K$ must be updated to account for the partial depletion of bundles because of the exchange. The updated values, $u'_j$ and $b'_k$ are respectively given by $$u'_j = u_j - v_j, \forall j \in T_k \tag{13}$$

and $$b'_k = b_k - \sum_{j \in T} a_{kj} v_j \tag{14}$$

The portfolio constraints do not modify the market surpluses $\mu_i$, Eq. (2), or imputed prices. The allocation of trade volumes for bundle trade offers subject to portfolio constraints may be further understood by referring now to FIG. 6B, in which an example of such a bundled trade is illustrated.

Figure 6B:
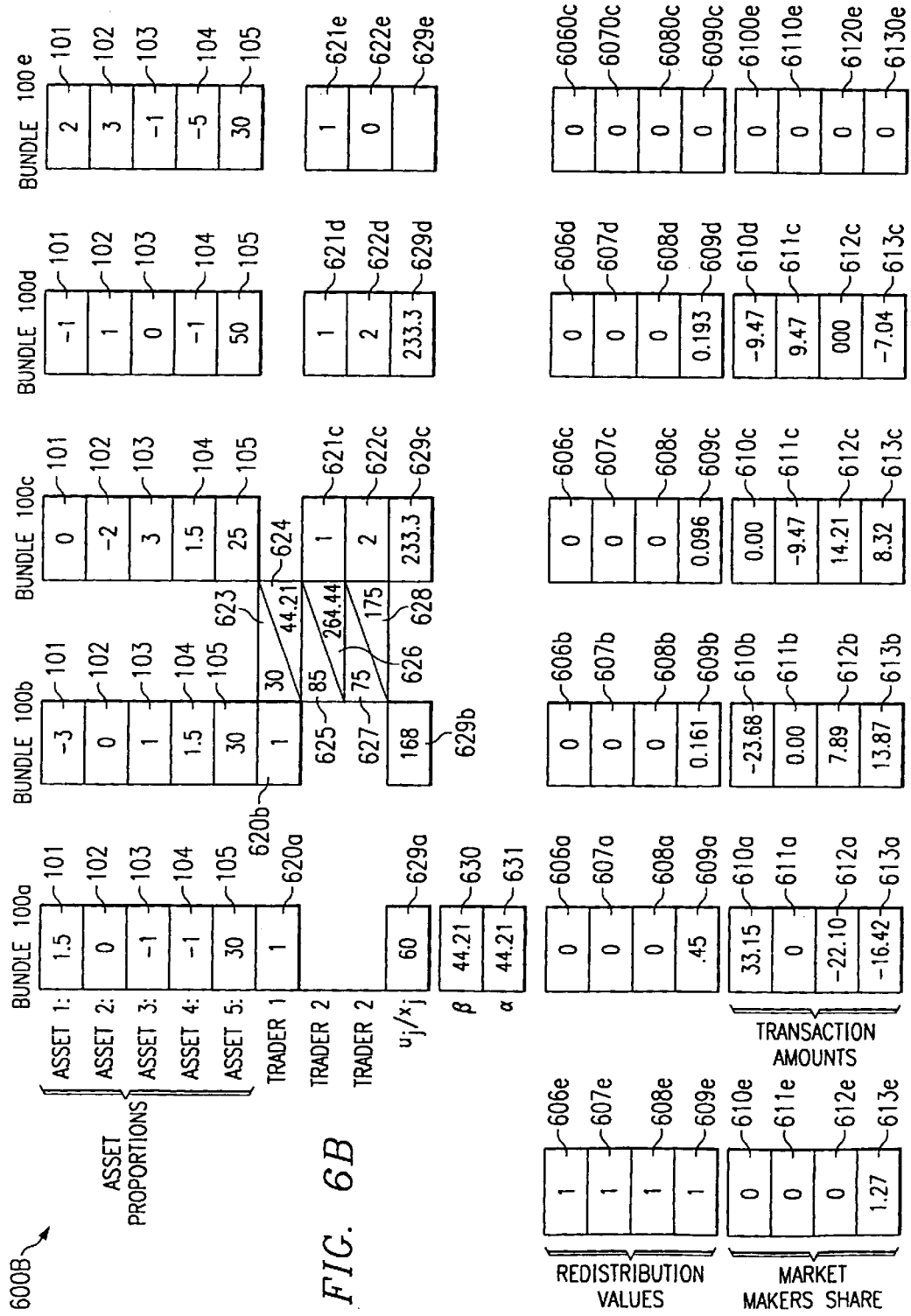
FIG. 6B schematically illustrates a matched transaction in accordance with another alternative embodiment of the present invention.

FIG. 6B illustrates bundled trade 600B. Bundled trade 600B differs from bundled trade 600A in FIG. 6A only in that it is subject to a set of portfolio constraints, and in the addition of a fifth bundle, bundle 100e. Bundles 100a and 100b are associated with a first market participant, labelled trader 1, and bundles 100c–100e are associated with a second market participant, trader 2. Because bundles 100a–100d are the same as bundled trade 600A in FIG. 6A, the matched exchange with respect to bundled trade 600B is the same as that in bundled trade 600A. Thus, the allocation values $x_j$ are also the same for these bundles. Bundle 10e does not participate in the matched exchange. In other words, the allocation value, $x_j$, corresponding to bundle 100e is equal to zero. The allocation values corresponding to bundles 100a–100d are the same as in bundled trade 600A, and, for clarity, have not been shown in FIG. 600B. Although, the matched exchange in bundled trade 600A and 600B are the same, the portfolio constraints in bundled trade 600B give rise to a different transaction volume in bundled trade 600B than the transaction volume in bundled trade 600A.

In bundled trade 600B, there is a single portfolio constraint associated with trader 1, and two portfolio constraints associated with trader 2. These are specified by assigning portfolio weights, $a_{ki}$, and constraint limits, $b_k$.

The portfolio weights, $a_{ki}$, corresponding to the portfolio constraint imposed by trader 1, are shown in fields 620a and 620b, to be equal to one for both bundle 100a and bundle 100b. Thus, trader 1 is indifferent as to the substitution of bundles 100a and 100b in a matched trade, in this example. The constraint limit for this portfolio constraint has the value 30, in field 623.

With respect to trader 2, there are two sets of portfolio weights and constraint limits. The portfolio weights for the first portfolio constraint imposed by trader 2 are shown in fields 621c–621e, corresponding to bundles 100c–100e. With respect to the first portfolio constraint of trader 2, the weights are all equal to one. In a matched trade in which all three bundles, 100c–100e participate, trader 2 is indifferent as to substitution of these bundles, one for another. This portfolio constraint has a constraint limit of 85, in field 625.

However, in a matched exchange in which only bundles 100c and 100d participate, trader 2 is not indifferent as to the substitutability of these bundles. With respect to the second portfolio constraint of trader 2, the portfolio weight attached to bundle 100c is equal to two, in field 622c, and the portfolio weight of attached to bundle 100d is equal to one, in field 622d. Thus one units of bundle 100c is substitutable for two unit of bundle 100d. There is no substitution of bundle 100e in this portfolio constraint as indicated by its portfolio weight of zero, in field 622e. The constraint limit for this portfolio constraint is 75, in field 627.

The limiting portfolio constraint is the constraint associated with the first trader. The values of $\delta_t$ for each of the portfolio constraints appear in fields 624, 626 and 628. The smallest value is 44.21, for the portfolio constraint imposed by the first trader.

The limiting portfolio constraint controls the allocation volumes. The value of the ratio $u_j/x_j$ for each of bundles 100a–100d is shown in fields 629a–629d, respectively. (Because the allocation value, $x_j$, for bundle 100e is zero, bundle 100e is not involved in the transaction, and no value has been entered in field 629e.) The value of $\delta_t$ corresponding to the limiting portfolio constraint is smaller than any value of $u_j/x_j$. Thus, transaction amounts are determined by the smallest value of $\delta_t$ in accordance with Eq. (11). The transaction amounts for bundled trade 600B are given in fields 610a–613a for each of the assets in bundle 100a, and similarly with respect to fields 610b–613b, 610c–613c, and 610d–613d. Comparing these transaction amounts for bundled trade 600B with the corresponding transaction amounts for bundled trade 600A, in FIG. 6A, it is seen that the transaction amounts with the portfolio constraint, bundled trade 600B, are reduced by the ratio of 44.12:60 from the transaction amounts without the portfolio constraint, bundled trade 600A, FIG. 6A. Market surpluses and imputed prices are the same as in bundled trade 600A, FIG. 6A, and have been omitted from bundled trade 600B for clarity.

In an alternative embodiment of the present invention including substitutability of bundles, portfolio constraints may be applied when trades are matched. In such an embodiment, the set of portfolio constraints Equation (9) are incorporated into the constraint set specified by Equation (3), in accordance with step 300 of FIG. 3. Then in step 302 of FIG. 3, allocation values, xj, are determined as previously described in conjunction with FIG. 3. Actual transaction allocations vj, in step 304, are then determined according to Equation (6).

In yet another alternative embodiment of the present invention, the portfolio constraints, Equation (9) may be incorporated into the constraint set, in step 300 of FIG. 3, with the second member as specified in Equation (4). The set of allocation values, $x_j$, is determined in step 302, by a step of extremization of the objective function, which is defined in step 301, and may remain in accordance with Equation (5).

Figure 7:
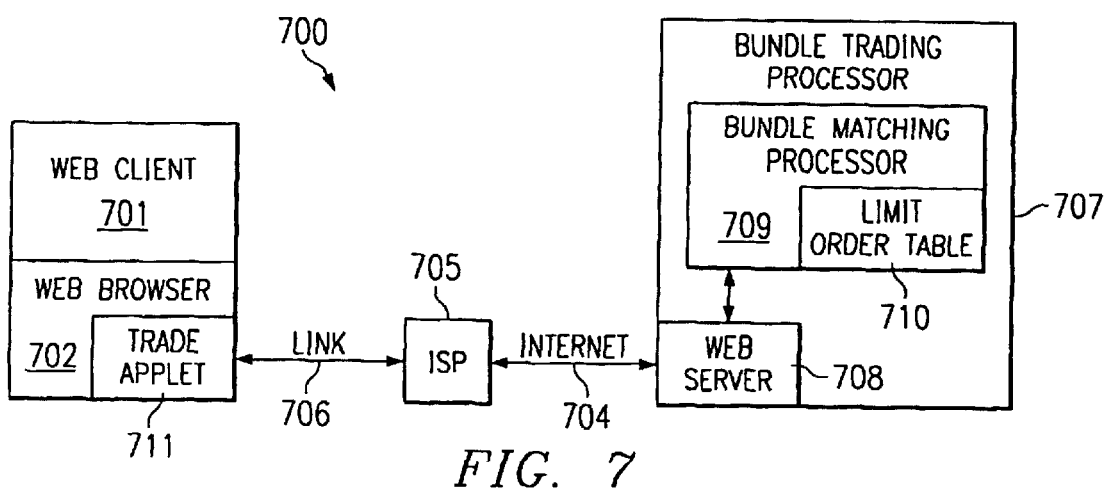
FIG. 7 schematically illustrates an embodiment of a data processing system according to the present invention.

A data processing system, such as data processing system 700 in FIG. 7, to be described, performs the method of the present invention by performing method steps such a those previously discussed, and in part made manifest in Equations (1)–(14). A specific embodiment of the present invention is instantiated through the choice of the preselected values appearing therein, and the process steps performed with respect thereto by the data processing system of the present invention. Calculational steps described in association with transaction 600 are for interpretive purposes only, in order to better understand the present invention. They do not necessarily represent literal process steps performed by the data processing system of the present invention, which will subsequently be described.

A distributed data processing system may provide the environment for asset bundle trading according to the method of the present invention. Refer now to FIG. 7 in which is schematically illustrated such an embodiment of a distributed data processing system architecture, data processing system 700. Data processing system 700 utilizes the World Wide Web to effect communication between market participants and the bundle trading market.

The "World Wide Web" (WWW) is a hypertext information and communication system used on the Internet with data communications operating according to a client/server model using a Hypertext Transfer Protocol (HTTP). HTTP is a known application protocol that provides users access to files using a standard page description language referred to as Hypertext Markup Language (HTML). It should be noted that HTML is an application of Standard Generalized Markup Language (SGML), an international standard (ISO 8879) for text information processing. Furthermore, the files that are accessed using HTML may be provided in different formats, such as text, graphics, images, sound, and video, among others. WWW functionality within data processing clients typically has been through the introduction of "web browsers" that allows for simple graphical user interface-based access to network servers. Two commercially available web browsers are Netscape Communicator™ and Internet Explorer™. Although the present invention as embodied in data processing system 700 employs the WWW for communication, such an embodiment is not essential to its practice. Alternative embodiments may employ other communication methodologies.

In data processing system 700, a market participant communicates and interacts with the bundle trading market using its own data processing hardware, web client 701. Web browser 702 incorporated in web client 701 provides the web services to web client 701. Communications between the market participant and the bundled trading market are transported over the Internet 704, the worldwide computer network. Web client 701 accesses the Internet 704, through an internet service provider (ISP) 705 which web client 701 reaches via link 706. Link 706 may be a telephone line to which web client 701 attaches by means of a data modem. Alternatively, link 706 might be a digital link such as Integrated Services Digital Networks (ISDN). In yet another alternative, web client 701 might attach directly to the Internet thereby eliminating link 706 and ISP 705.

In data processing system 700, bundle trading processor 707 is directly connected to the Internet 704 by means of its web server 708. Communications between each market participant's web client, such as web client 701, and the market is handled by web server 708. Trade data is passed from web server 708 to bundle matching processor 709 in which trade execution takes place. Bundle matching processor 709 also passes trade data back to web server 708 for communication to web client 701 whence it becomes available to the market participant. Trade orders for execution are stored in a database, limit order table 710, within bundle matching processor 709. As trade orders are received, they are stored in limit order table 710. Bundle matching processor then updates limit order table 710 as trades are executed. It also notifies traders about the execution via the Internet as previously described. These processes will be described in detail subsequently. Both order submission and transaction data processing are performed using distributed data processing.

Distributed processing in distributed data processing system 700 may be implemented using Java technology. Java is a programming language that is designed as a distributed and dynamic language. A Java capable web browser can download and execute Java applications, called applets, just as if the applet were an executable resident on the browser's host data processor. Web client 701 in data processing system 700 contains trade applet 711 in web browser 702. The interactions of the market participant, using web client 701, with the bundle trading processor 707 are through trade applet 711. When a trader initially connects to bundle trading processor 707 over the Internet 704, trade applet 711 is downloaded to web client 701. Trade applet 711 receives and processes data sent by bundle trading processor 707, as well as sending orders thereto. In performing these tasks, both trade applet 711 and bundle trading processor 707 may invoke Java methods that are implemented both on the server side, that is, on web server 708, and the client side, that is, on web client 702 through trade applet 711, respectively.

Figure 8:
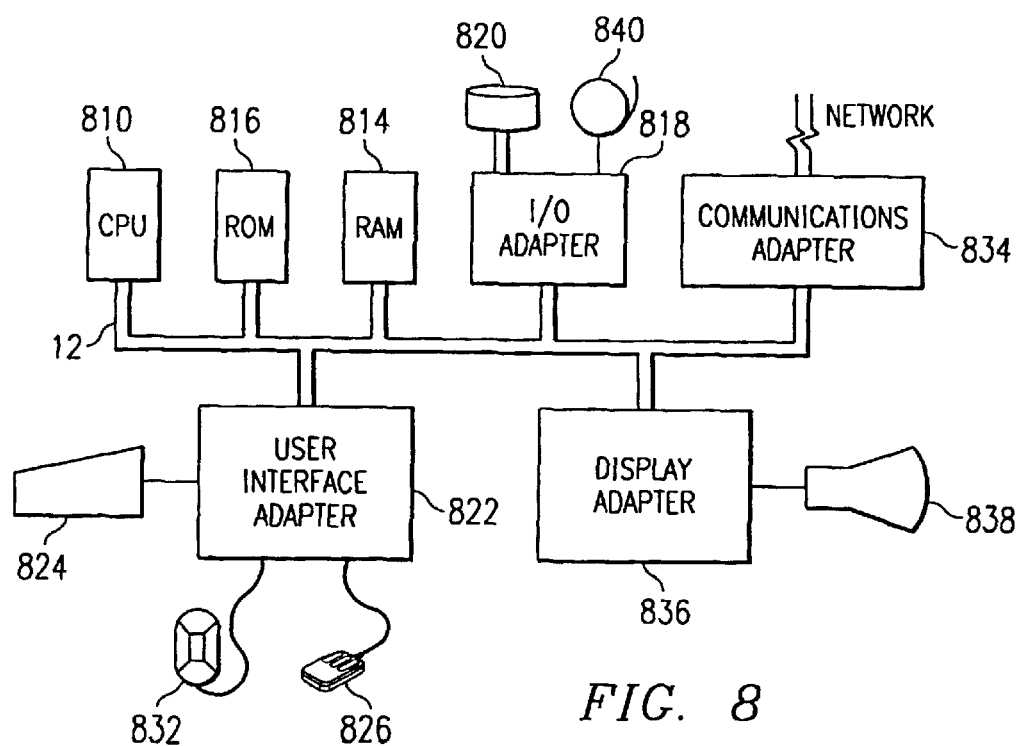
FIG. 8 illustrates, in block diagram form, a data processing system implemented in accordance with an embodiment of the present invention.

FIG. 8 illustrates a data processing system 800 that may be utilized to implement a web client 702 that executes the methodology of the present invention. Data processing system 800 comprises a central processing unit (CPU) 810, such as a microprocessor. CPU 810 is coupled to various other components via system bus 812. Read-only memory (ROM) 816 is coupled to the system bus 812 and includes a basic input/output system (BIOS) that controls certain basic functions of the data processing system 800. Random access memory (RAM) 814, I/O adapter 818, and communications adapter 834 are also coupled to system bus 812. I/O 818 may be a small computer system interface (SCSI) adapter that communicates with a disk storage device 820. Communications adapter 834 interconnects bus 812 with an outside network enabling the data processing system to communicate with other such systems. Communications adapter 834 may be a modem in an embodiment of the present invention in which link 706 is a telephone line connecting web client 702 to ISP 705 by means of a dial-up connection. Alternatively, if link 706 is an ISDN line, communications adapter 834 might be an ISDN terminal adapter. Input/output devices are also connected to system bus 812 via user interface adapter 822 and display adapter 836. Keyboard 824, trackball 832, and mouse 826 are all interconnected to bus 812 via user interface adapter 822. Display monitor 838 is coupled to system bus 812 by display adapter 836. In this manner, a user is capable of inputting to the system through keyboard 824, trackball 832, or mouse 826, and receiving output from the system via speaker 828 and display 838. Trade data transmitted to web client 701 by web server 708, and processed for outputting by trade applet 711, may be presented to the market participant on display 838.

Similarly data processing system 800 may be utilized to implement bundle trading processor 707. In such an embodiment, data processing system 800 may represent a high-end work station or minicomputer, and may include multiple processors, 810. In a data processing system 800 implementing a bundle trading market, communications adapter 834 may be a network transceiver.

Some embodiments of the invention may include implementations as a computer system program to execute the method or methods described herein, and as a computer program product. According to the computer system implementation, sets of instructions for executing the method or methods are resident in RAM 814 of one or more computer systems configured generally as described above. Until required by the computer system, the set of instructions may be stored as a computer program product in another computer memory, for example, in disk drive 820 (which may include a removable memory such as an optical disk or floppy disk for eventual use in disk drive 820).

Moreover, as has been previously described, the computer program product can also be stored at another computer and transmitted in a computer readable medium when desired to the market participant's web client 701 by an external network such as the Internet 704. One skilled in the art would appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Figure 9A:
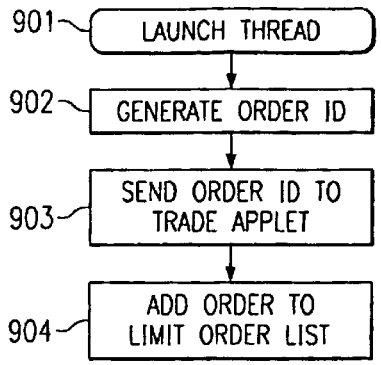
FIG. 9 illustrates flow diagrams of distributed data processing threads according to an embodiment of the present invention.
Figure 9B:
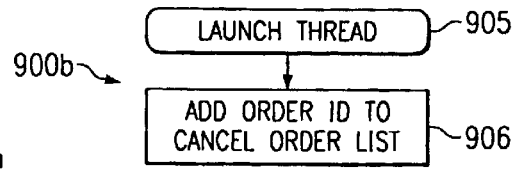
Figure 9C:
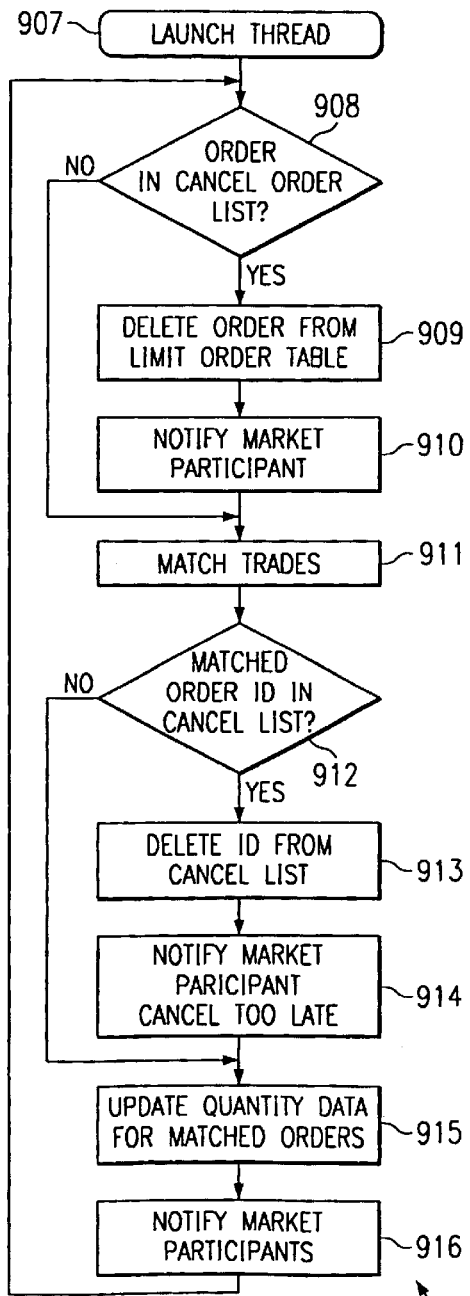

Refer now to FIG. 9 in which a flow chart illustrating an embodiment of a method of the present invention in a multithread computer environment is shown. Java is such a multithreading environment. Threads are computational units within a software program that carry out different tasks. Generally, threads are asynchronous. That is, one thread does not need to wait for another thread to complete execution before it can start running.

A bundled trade is entered when a market participant sends an order to bundle trading processor 707. This is effected by trade applet 711 invoking a send order method which causes the launching of thread 900*a* in step 901. Each time a market participant enters an order, another copy of thread 900*a* is launched. In step 902, an order identification is generated. The order identification is a unique identifier that identifies each order in the market. The order identification is sent back to trade applet 711 in step 903. A market participant may submit multiple orders and the order identification permits a trade applet, such as trade applet 711, to associate, with the appropriate order, data pertaining to transactions with respect to each order entered. In step 904, the order is added to an order database in limit order table 710. If a market participant imposes one or more portfolio constraints, parameters specifying each constraint, as previously described, are entered into a portfolio constraint database in limit order table 710. A portfolio identifier may be attached to each constraint by thread 900a to associate bundles in the limit order database with their corresponding portfolio constraints. The limit order database and portfolio constraint database will be discussed further below in conjunction with FIG. 11.

Because a second market participant may enter an order before the thread entering an order from a first market participant has completed executing, it is possible that two orders may be assigned the same order identification. In an embodiment of the present invention, this can be prevented by forcing the send order method of thread 900a to be synchronous. That is, the thread launched by the second market participant's order entry cannot begin execution until the thread launched when the first market participant entered its order completes execution.

A market participant may also delete an order prior to its execution. When the market participant elects to cancel his order, trade applet 711 invokes a cancel order method, launching thread 900b, in step 905. In step 906, the order identification of the order to be cancelled is added to a cancel order list in limit order table 710.

A third thread 900c effects the execution of bundled trades. This thread launches in step 907 when a bundle trading "market", such as bundled trading processor 707, is initiated, and then continuously loops through the limit order database. First, in step 908, orders in the order database are checked to see if they are in the cancel order list. If so, they are deleted from the database in step 909, and the market participant is notified in step 910 through the invocation of methods implemented in the trade applet, such as trade applet 711, as previously discussed. Then, in step 911, trades are matched, and any portfolio constraints applied, using the methods of the present invention previously described hereinabove. Thread 900c retrieves any required portfolio constraint data from the portfolio constraint database.

In step 912, the order identification of matched trades are compared with the current entries in the cancel order list. If a matched trade appears in the cancel order list, the order identification is deleted from the cancel order list, step 913, and the market participant is notified, again through the trade applet, that his cancellation came too late. In any case, quantities are updated for matched trades, step 915, and the market participants are notified, step 916. As previously described, the trade applet receives the updated data and processes it for outputting to the market participant, for example by means of a graphic display of an order table on display 838.

However, a market participant need not be associated with a human operator. An embodiment of the present invention may be utilized in a purely electronic marketplace in which trades are entered by an automated trading program. An illustrative example might be trading in shares of index funds. The fund's "trader", a software program, seeks to buy or sell, as a bundle, all of the assets forming the index. Bundles are bought and sold as subscribers either acquire or dispose of shares of the fund. Buy orders and sell orders may be entered electronically via the Internet, for example, and the transaction between the subscriber and the fund closed by using electronic funds transfer. The trade data received via the trade applet might then be stored in RAM 814 or mass storage device 820 for further processing in closing the transaction. From the perspective of the bundle trading market, the market participants in this market are program trading data processing systems.

Figure 10:
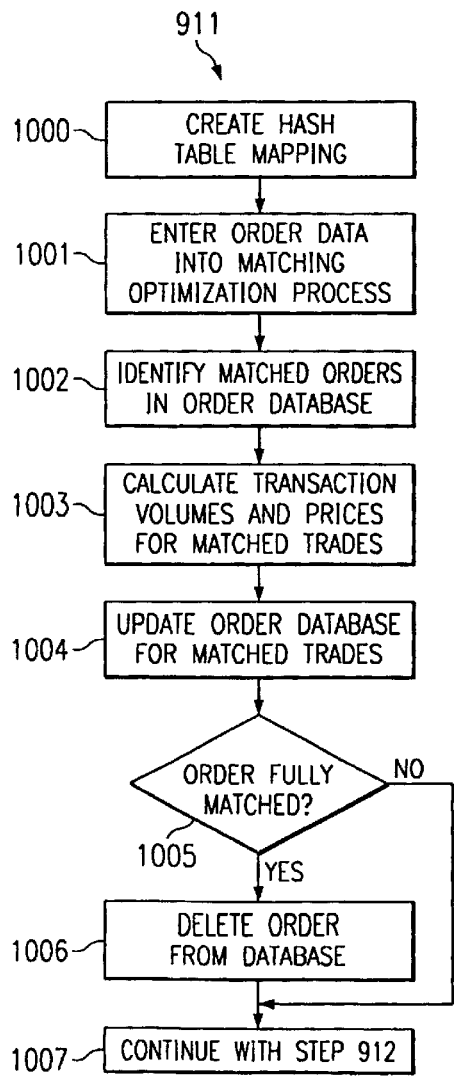
FIG. 10 illustrates a flow diagram of a method of trade matching in accordance with an embodiment of the present invention.

In FIG. 10, a flowchart is illustrated depicting the data processing of trade matching, step 911, in further detail. In step 1000, a hash table is generated that maps order identifications to bundle indices used in the matching algorithm as described hereinabove with respect to FIG. 2. Step 1001 includes entering the order data contained in the order database into the matching optimization process previously described in conjunction with FIG. 3. The optimization process outputs matched trade bundles identified by a bundle index. The hash table generated in step 1001 is used to identify matched orders in the order database by order identification, step 1002. The transaction volumes and prices are then calculated using the method of the present invention previously described in association with FIG. 4, in step 1003. In step 1004, the order database is updated based on the transaction volumes. In other words, new $u_j$ are calculated to account for the part of each bundle "j" exchanged in the transaction. This may be in accordance with Equation (13) in an embodiment of the present invention imposing portfolio constraints on the transaction volume allocation. If an order is fully matched, the new value of $u_j$ for that bundle is zero, step 1005. It then is deleted from the database in step 1006. In an embodiment imposing portfolio constraints on the transaction volume allocation, the portfolio limits, $b_k$, are also updated in step 1004, and if the updated value is zero, in step 1005, all bundles with non-zero weight in the corresponding portfolio constraint are deleted from the order database in step 1006. Otherwise, it remains in the database, and may participate in further transactions. After the database is updated, the process continues in step 1007 with step 912.

Figure 11A:
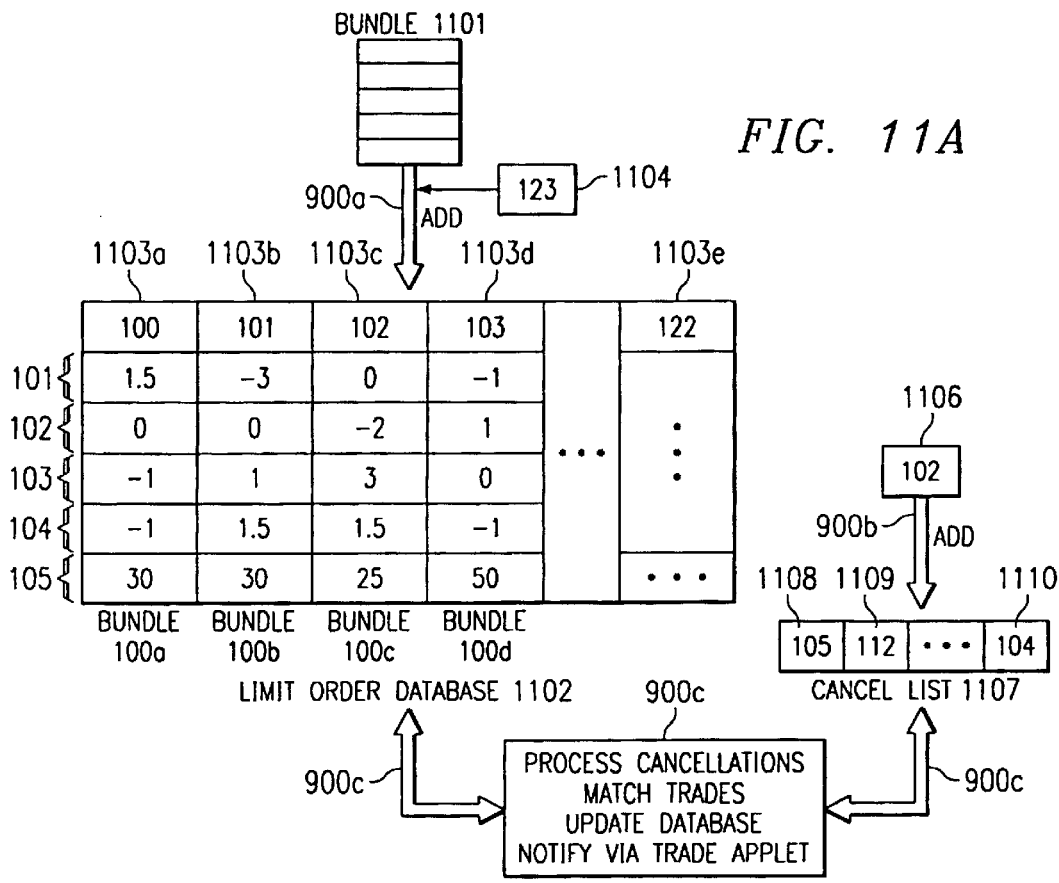
FIG. 11A schematically illustrates the interaction of distributed data processing threads according to an embodiment of the present invention.
Figure 11B:
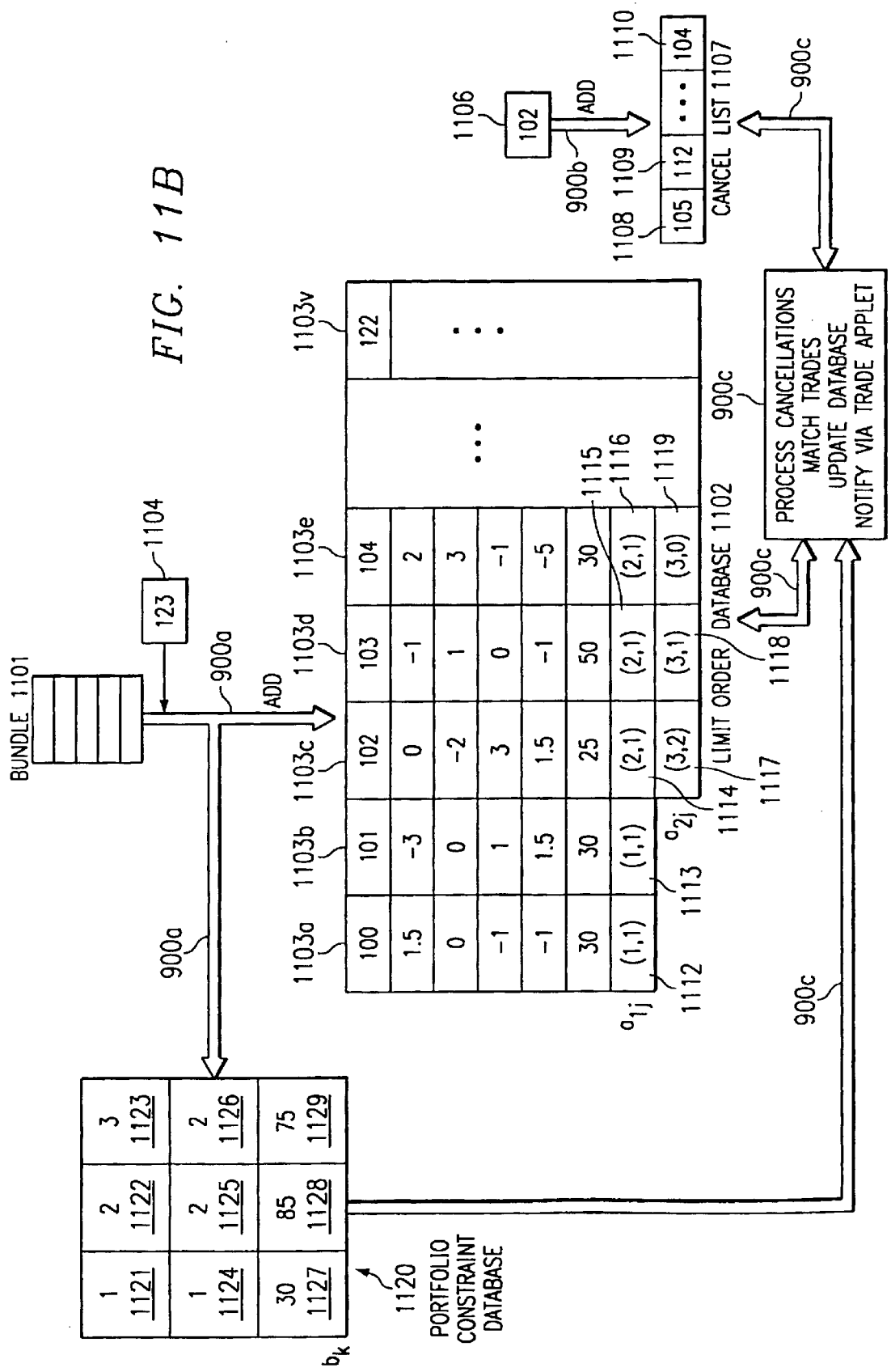
FIG. 11B schematically illustrates the interaction of distributed data processing threads according to an alternative embodiment of the present invention.
Figure 11C:
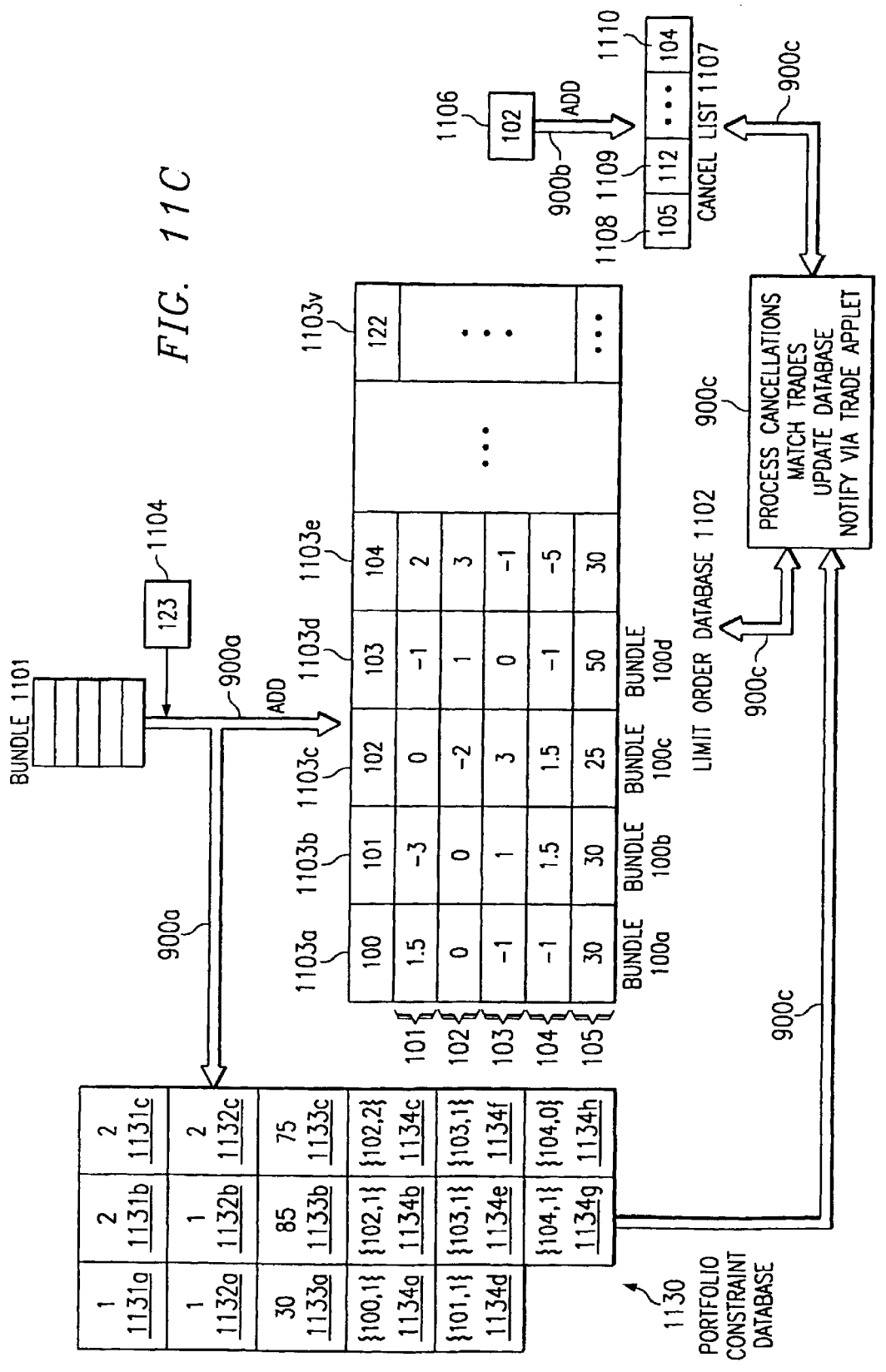

The operation of a data processing system according to an embodiment of the present invention may be further appreciated by referring to FIG. 11A–11C. The operation of the asynchronous threads on the data structures within a data processing system according to the present invention, such as data processing system 700, is schematically illustrated therein.

Referring to FIG. 11A, a new trade bundle, bundle 1101, is to be added to limit order database 1102. Bundles within database 1102 are identified by order identifications, fields 1103a–1103d, and 1103v. The last order identification in database 1102 is "122" in field 1103v. A first thread, corresponding to thread 900a, generates the next order identification, "123" in field 1104. It then adds the new order, bundle 1101 to database 1102.

A market participant may cancel an order before it is executed. An order posted for cancellation, field 1106 containing the order's identification, here shown to be order "102", is added to cancel order list 1107, by a second asynchronous thread corresponding to thread 900b.

The third thread in FIG. 11A, corresponding to thread 900c, is the trade matching thread. It monitors both database 1102 and cancel list 1107. Orders within database 1102, such as bundles 100a–100d shown, are continuously matched using the methods of the present invention heretofore described. If an order identification appears in cancel list 1107, for example, order "105," "112," or "104," in fields 1108–1110 respectively, it is deleted both from database 1102 and cancel list 1107 by thread 900c. Matched trades in database 1102 are updated by thread 900c to reflect the exchange of assets resulting from the transaction. Thread 900c also notifies market participants via a trade applet, such as trade applet 711. As previously discussed, notification is made with respect to both matched trades, cancelled orders, and if an order posted for cancellation had been executed before cancellation was attempted.

In an embodiment of the present invention in which market participants may specify portfolio constraints, as discussed hereinabove in conjunction with FIG. 6B, the information processed by the threads must also include the information specifying the portfolio constraints. Referring to FIG. 11B, there is illustrated therein an embodiment of limit order data base 1102 in which incorporates portfolio constraint data, as discussed hereinabove in conjunction with FIG. 6B. The portfolio weights specifying constraints are stored in fields 1112–1119 in limit order data base 1102. Each entry in fields 1112–1119 holds a pair of values, the first of which is the portfolio weight for the corresponding bundle in a portfolio constraint having an identifier corresponding to the second value in the pair. Portfolio identifiers are assigned when portfolio constraints are entered, via thread 900a, for a given bundled trade, and are stored in portfolio constraint database 1120. Portfolio constraint identifiers are stored in fields 1121–1123 in portfolio constraint database 1120. Fields 1124–1126 in database 1120 include a market participant identifier. Thus, the first portfolio constraint identified as "1" is associated with trader 1, field 1124, and the remaining two portfolio constraints, identified as "2" and "3" are associated with trader 2, fields 1125 and 1126. It would be understood that other identifier symbols might be associated with portfolio constraints and market participants, provided they are unique. Portfolio constraint database 1120 effects the association between the two sets of identifiers. The entries in fields 1127–1129 in database 1120 represent the portfolio limits specified with each of the portfolio constraints. On execution of a matched trade by thread 900c, thread 900c retrieves the portfolio constraint data from limit order data base 1102 when generating transaction volumes, as discussed in conjunction with FIG. 6B.

Alternatively, all portfolio constraint data may be stored in a portfolio constraint data base. Such an embodiment is illustrated in FIG. 11C showing portfolio constraint data base 1130 therein. As bundle trades are entered, thread 900a adds the portfolio constraint data specified by the market participant to portfolio constraint data base 1120. Fields 1131a–1131c in portfolio constraint data base 1120 include a trader identifier. Because trader 2, as discussed in conjunction with FIG. 6B, has specified two portfolio constraints, the identification of trader 2 appears twice, in fields 1131b and 1131c, in portfolio constraint data base 1130. A portfolio identifier appears in fields 1132a–1132c. The identifier "1" in field 1132b identifies the respective portfolio constraint as the first portfolio constraint imposed by trader 2. Similarly, the identifier "2" in field 1132c identifies the associated data as specifying the second portfolio constraint of trader 2. The constraint limits for each of the portfolio constraints appears in fields 1133a–1133c in portfolio constraint data base 1130. Fields 1134a–1134c contain an ordered pair of values, shown as enclosed in braces, the first value of which represents a trade bundle identifier from one of fields 1103a–1103e and 1103v, in limit order data base 1102, of the trade bundle to which the constraint applies, and the second value is the corresponding portfolio weight. Additional fields 1134 specify additional trade bundle identifiers corresponding to additional trade bundles to which the respective portfolio constraint applies, along with the corresponding portfolio weight. Thus, in fields 1134d–1134h are the trade bundle identifiers and portfolio constraint weights for each additional trade bundle to which each of the portfolio constraints applies. Because the first portfolio constraint of trader 2 applies to three trade bundles, 100c–100e, a third identifier and portfolio weight pair corresponding to bundle 100e, in FIG. 6B, is included in field 1134g. Note that portfolio constraint 2 of trader 2 applies to bundles 100c and 100d in FIG. 6B. Bundle 100e corresponds to bundle identifier 104 in field 1103e, and in field 1134h, a weight of zero has been associated with bundle identifier 104. Alternatively, field 1134h may be empty, thereby signifying to thread 900c that the bundle associated with identifier 104 does not participate in the second portfolio constraint of trader number 2. Thread 900c retrieves the portfolio constraint data values from portfolio constraint data base 1130, and generates transaction volumes as described in conjunction with FIG. 6B.

Figure 12:
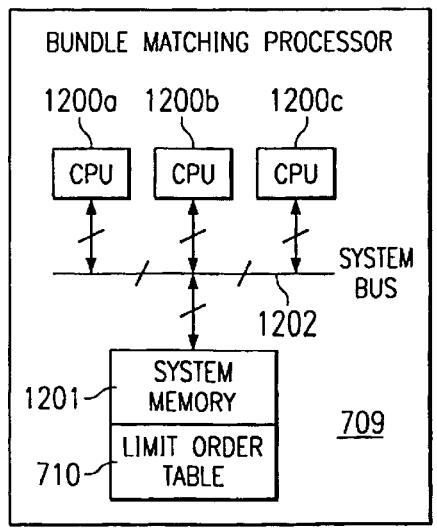
FIG. 12 illustrates, in block diagram form, a data processing system in accordance with an embodiment of the present invention.

As previously noted, a data processing system for matching bundle trades in accordance with the present invention is adaptable for a multiprocessor environment. Refer now to FIG. 12 in which an embodiment of a bundle matching processor 709 having multiple processors is illustrated. Bundle matching processor 709 includes three central processing units CPUs 1200a–1200c. These are connected to a system memory 1201 via system bus 1202. Each of CPUs 1200a–1200c may be dedicated to executing, independently and asynchronously, a bundle trading thread in accordance with a method of the present invention. For example, CPU 1200a may execute thread 900a for entering bundle trades, as discussed hereinabove. Similarly, CPU 1200b may execute thread 900c for matching trades, and CPU 1200c may execute thread 900b for deleting bundle trades. System memory 1201 may include limit order table 710. Alternatively, one CPU, say CPU 1200a, may be dedicated to executing two threads, for example, thread 900a for entering bundle trades, and thread 900c for deleting bundle trades. In such an embodiment, one of the other two CPUs, for example, CPU 1200c, may execute thread 900b for matching bundle trades. The remaining CPU may incorporate web server 708, or alternatively web server 708 might be embodied in CPU 1200a. It would be understood by one of ordinary skill in the art that the alternative embodiments represented by the various presentations of the multiprocessor tasks are all embraced within the disclosed methods and apparatus of the present invention. In yet another alternative embodiment, CPUs 1200a–1200c may execute threads in synchronous fashion.

Although the present invention and its advantages have been described in detail, it should be understood that various changes, substitutions and alterations can be made herein without departing from the spirit and scope of the invention as defined by the appended claims.

What is claimed is:

1. In data processing system, a method of asset trading comprising the steps of:
   entering a plurality of bundled trades, each of said plurality of bundled trades comprising:
   a plurality of assets to be traded;
   a bundle size value;
   a set of proportions of each asset of plurality of assets to be traded in units of said bundle size value; and
   one or more portfolio constraints, each of said one or more portfolio constraints including:
   a set of portfolio weights; and
   a portfolio limit, and wherein each said portfolio constraint is associated with a set of bundled trades and a market participant corresponding two set of bundled trades; and matching trades among said plurality of bundled trades, wherein said step of matching trades further comprises the step of selecting a set of bundles to be traded among said plurality of bundles, bundles selected to be traded forming a set of selected bundles.

2. The method of claim 1 wherein in said of matching trades to be traded further comprises the steps of:
selecting a set of numerical values, wherein in said set of numerical values has the same number of members as a number of said set of selected bundles, said set of numerical values forming a set of allocation values; and
multiplying each proportion of asset to be traded by one of each numerical value of said set of numerical values, said step of multiplying being performed for each bundled trade, thereby forming a set of weighted proportions of assets to be traded, said set having a number of weighted proportions equal to a number of said assets to be traded.

3. The method of claim 1 wherein in said step of entering bundled trades includes entering bundled trades using distributed processing over a network.

4. The method of claim 1 wherein in the step of matching bundled trades further comprises the step of reporting match trades using distributed processing over a network.

5. The method of claim 1 wherein in the step of entering bundled trades includes executing an asynchronous thread for entering bundled trades.

6. The method of claim 1 wherein in the step of matching bundled trades includes executing an asynchronous thread for matching bundled trades.

7. A data processing system for trading asset bundles comprising:
circuitry for entering a plurality of bundled trades, each of said plurality of bundled trades comprising:
a plurality of assets to be traded;
a bundle size value;
a set of proportions of each asset of plurality of assets to be traded in units of said bundle size value; and
one or more portfolio constraints, each of said one or more portfolio constraints including:
a set of portfolio weights; and
a portfolio limit, and wherein each said portfolio constraint is associated with a set of bundled trades and a market participant corresponding to set said of bundled trades; and
circuitry for matching bundled trades among said plurality of bundled trades, wherein in each bundled trade includes a set of proportions of each asset of said plurality of assets to be traded in units of said bundle size value and wherein said circuitry for matching trades includes circuitry for selecting a set of bundles to be traded among said plurality of bundled trades, bundles selected to be traded forming a set of selected bundles.

8. The data processing system of claim 7 wherein said circuitry for entering bundled trades include circuitry for entering trades using distributed processing over a network.

9. The data processing system of claim 7 wherein said circuitry for matching bundled trades further comprises circuitry for reporting matched trade data using distributed processing over a network.

10. The data processing system of claim 7 wherein said circuitry for entering bundled trades include circuitry executing an asynchronous thread for entering bundled trades.

11. The data processing system of claim 7 wherein said circuitry for matching bundled trades includes circuitry executing an asynchronous thread for matching bundled trades.

12. The data processing system of claim 7 wherein said circuitry for matching trades further comprises circuitry for allocating an amount of each bundle to be traded among said plurality of bundles.

13. The data processing system of claim 7 wherein each bundled trade includes a bundle size value.

14. The data processing system of claim 7 wherein in said circuitry for matching trades further comprises:
circuitry for selecting a set of numerical values, wherein in said set of numerical values has the same members as a number of said set of selected bundles, said set of numerical values forming a set of allocation values; and
circuitry for multiplying each proportion of asset to be traded by one of each numerical value of said set numerical values, said set of multiplying being performed for each bundled trade, thereby forming a set of weighted proportions of assets to be traded, said set having a number of weighted proportions equal to a number of said assets to be traded.

15. A program product operable for storage in a computer readable medium, said program product for bundling trading of assets comprising:
programing for entering a plurality of bundled trades, each of said plurality of bundled trades comprising:
a plurality of assets to be traded;
a bundle size value;
a set of proportions of each asset of plurality of assets to be traded in units of said bundle size value; and
one or more portfolio constraints, each of said one or more portfolio constraints including:
a set of portfolio weights; and
a portfolio limit, and wherein each said portfolio constraint is associated with a set of bundled trades and a market participant corresponding to set said of bundled trades; and
programing for matching bundled trades among said plurality of bundled trades, wherein in each bundled trade includes a set of proportions of each asset of said plurality of assets to be traded in units of said bundle size value and wherein said programming for matching trades includes programing for selecting a set of bundles to be traded among said plurality of bundled trades, bundles selected to be traded forming a set of selected bundles.

16. The program product operable for storage in a computer readable medium of claim 15 wherein said programming for matching trades further comprises:
programming for selecting a set of numerical values, wherein in said set of numerical values has the same members as a number of said set of selected bundles, said set of numerical values forming a set of allocation values;
programming for multiplying each proportion of asset to be traded by one of each numerical value of said set numerical values, said set of multiplying being performed for each bundled trade, thereby forming a set of weighted proportions of assets to be traded, said set having a number of weighted proportions equal to a number of said assets to be traded.

17. A method of asset trading comprising the steps of:
entering a plurality of bundled trades, each of said plurality of bundled trades comprising:
a plurality of assets to be traded:
a bundle size value;
a set of proportions of each asset of plurality of assets to be traded in units of said bundle size value; and one or more portfolio constraints, each of said one or more portfolio constraints including:
  a set of portfolio weights; and
  a portfolio limit, and wherein each said portfolio constraint is associated with a set of bundled trades and a market participant corresponding two set of bundled trades; and
matching trades among said plurality of bundled trades wherein said step of matching trades further comprises the steps of:
selecting a set of numerical values, wherein said set of numerical values has the same number of members as a number of said plurality of entered bundled trades, said set of numerical values forming a set of allocation values; and
multiplying each proportion of asset of to be traded by one of each numerical value of said set of numerical values, said step of multiplying being performed for each bundled trade, thereby forming a set of weighted proportions of assets to be traded, said set having a number weighted proportions equal to a number of said assets to be traded.

* * * * *